United States Patent
Homma et al.

(10) Patent No.: US 9,430,795 B2
(45) Date of Patent: *Aug. 30, 2016

(54) DISPLAY CONTROL DEVICE, DISPLAY CONTROL METHOD, SEARCH DEVICE, SEARCH METHOD, PROGRAM AND COMMUNICATION SYSTEM

(71) Applicant: Sony Corporation, Tokyo (JP)

(72) Inventors: Shunichi Homma, Tokyo (JP); Yoshiaki Iwai, Tokyo (JP); Jianing Wu, Tokyo (JP)

(73) Assignee: Sony Corporation (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/492,610

(22) Filed: Sep. 22, 2014

(65) Prior Publication Data

US 2015/0012386 A1 Jan. 8, 2015

Related U.S. Application Data

(63) Continuation of application No. 13/396,911, filed on Feb. 15, 2012, now Pat. No. 8,898,581.

(30) Foreign Application Priority Data

Feb. 22, 2011 (JP) ............... P2011-035886
Feb. 22, 2011 (JP) ............... P2011-035887

(51) Int. Cl.
  *G06F 3/048* (2013.01)
  *G06Q 30/06* (2012.01)
  *G06F 17/30* (2006.01)

(52) U.S. Cl.
  CPC ..... *G06Q 30/0625* (2013.01); *G06F 17/30029* (2013.01); *G06F 17/30061* (2013.01); *G06F 17/30864* (2013.01); *G06Q 30/0601* (2013.01); *G06Q 30/0643* (2013.01)

(58) Field of Classification Search
  None
  See application file for complete search history.

(56) References Cited

U.S. PATENT DOCUMENTS

| | | | |
|---|---|---|---|
| 5,680,856 A | 10/1997 | van Dijk | |
| 5,696,964 A | 12/1997 | Cox et al. | |
| 5,768,135 A | 6/1998 | Park et al. | |
| 6,701,207 B1 | 3/2004 | Gazzuolo | |
| 7,130,849 B2 | 10/2006 | Yayoi et al. | |
| 7,328,119 B1* | 2/2008 | Pryor | A63B 71/06 128/920 |
| 7,617,016 B2* | 11/2009 | Wannier | A41H 3/007 700/132 |

(Continued)

FOREIGN PATENT DOCUMENTS

| | | |
|---|---|---|
| JP | 10-040268 A | 2/1998 |
| JP | 2003-228581 A | 8/2003 |

(Continued)

OTHER PUBLICATIONS

JP Office Action for Application No. 2011-035886 dated, Jul. 10, 2014.

(Continued)

*Primary Examiner* — Hung Le
(74) *Attorney, Agent, or Firm* — Lerner, David, Littenberg, Krumholz & Mentlik, LLP

(57) ABSTRACT

An information processing apparatus may include a control unit to control display of parts information of a plurality of items, to generate search information according to feedback from a user for the parts information, and to control display of a search result according to the search information.

14 Claims, 15 Drawing Sheets

(56) References Cited

U.S. PATENT DOCUMENTS

| | | | |
|---|---|---|---|
| 7,962,368 B2 | 6/2011 | Kumar et al. | |
| 8,095,426 B2 | 1/2012 | Adelman et al. | |
| 8,260,689 B2 | 9/2012 | Dollens | |
| 8,275,590 B2 | 9/2012 | Szymczyk et al. | |
| 8,429,018 B2 | 4/2013 | Westphal | |
| 8,525,828 B1* | 9/2013 | Bates | G06T 15/00 345/419 |
| 2001/0026272 A1* | 10/2001 | Feld | A41H 3/007 345/419 |
| 2002/0010655 A1* | 1/2002 | Kjallstrom | G06Q 30/02 705/26.62 |
| 2002/0174120 A1 | 11/2002 | Zhang et al. | |
| 2002/0184625 A1 | 12/2002 | Allport | |
| 2004/0078285 A1 | 4/2004 | Bijvoet | |
| 2004/0113945 A1* | 6/2004 | Park | G06F 17/5004 715/765 |
| 2004/0186765 A1 | 9/2004 | Kataoka | |
| 2005/0131776 A1* | 6/2005 | Perotti | G06Q 30/0643 705/27.2 |
| 2005/0234782 A1 | 10/2005 | Schackne et al. | |
| 2005/0256686 A1 | 11/2005 | Stabelfeldt et al. | |
| 2006/0070276 A1* | 4/2006 | Clark | G09F 1/08 40/538 |
| 2006/0212821 A1* | 9/2006 | Charles | G06F 17/5009 715/764 |
| 2006/0235768 A1* | 10/2006 | Tatum | G06Q 10/087 705/28 |
| 2007/0226082 A1 | 9/2007 | Leal | |
| 2008/0177641 A1 | 7/2008 | Herniak et al. | |
| 2008/0262944 A1* | 10/2008 | Wu | G06Q 30/0603 705/27.2 |
| 2008/0270478 A1 | 10/2008 | Liu et al. | |
| 2009/0094138 A1* | 4/2009 | Sweitzer | G06Q 30/0601 705/26.1 |
| 2009/0138379 A1 | 5/2009 | Scheman | |
| 2009/0144173 A1* | 6/2009 | Mo | G06N 3/006 705/26.1 |
| 2009/0211137 A1 | 8/2009 | Trantham et al. | |
| 2009/0307109 A1* | 12/2009 | Litke | G06Q 10/087 705/26.1 |
| 2010/0011370 A1* | 1/2010 | Kubo | G06F 8/60 718/104 |
| 2010/0030578 A1* | 2/2010 | Siddique | G06Q 10/0637 705/3 |
| 2010/0049629 A1 | 2/2010 | Rathod et al. | |
| 2010/0070384 A1* | 3/2010 | Kruusmaa | A41H 1/00 705/26.1 |
| 2010/0100457 A1 | 4/2010 | Rathod et al. | |
| 2010/0211900 A1* | 8/2010 | Fujioka | A63F 13/12 715/765 |
| 2010/0228646 A1* | 9/2010 | Heidel | G06Q 30/02 705/26.1 |
| 2010/0268661 A1 | 10/2010 | Levy et al. | |
| 2011/0022372 A1 | 1/2011 | Isogai et al. | |
| 2011/0078209 A1* | 3/2011 | Rusberg | A41H 1/00 707/802 |
| 2011/0229948 A1 | 9/2011 | Spitz | |
| 2011/0295711 A1* | 12/2011 | Mazmanyan | G06Q 30/0631 705/26.7 |
| 2012/0030152 A1 | 2/2012 | Pueyo et al. | |
| 2012/0130869 A1 | 5/2012 | Shergill et al. | |
| 2012/0239535 A1 | 9/2012 | Leal | |
| 2013/0046620 A1* | 2/2013 | Pahls | G06Q 30/0269 705/14.49 |
| 2013/0215116 A1* | 8/2013 | Siddique | G06Q 30/0643 345/420 |

FOREIGN PATENT DOCUMENTS

| | | |
|---|---|---|
| JP | 2004-029957 A | 1/2004 |
| JP | 2004-220267 A | 8/2004 |
| JP | 2005-309786 A | 11/2005 |
| JP | 2007-179139 A | 7/2007 |
| JP | 2008-276775 A | 11/2008 |
| JP | 2010-113429 A | 5/2010 |
| WO | 2007043679 A1 | 4/2007 |

OTHER PUBLICATIONS

JP Office Action for Application No. 2011-035887 dated, Jul. 10, 2014.

* cited by examiner

| USER ID | SEARCH TARGET | CLASSIFIER |
|---|---|---|
| USER 1 | CUTE DRESS | CLASSIFIER m1 |
| | ADULT-STYLE DRESS | CLASSIFIER m2 |
| | CUTE CAMISOLE | CLASSIFIER m3 |
| | | |
| USER 2 | CUTE DRESS | CLASSIFIER m1' |
| | ADULT-STYLE DRESS | CLASSIFIER m2' |
| | CUTE CAMISOLE | CLASSIFIER m3' |
| ⋮ | ⋮ | ⋮ |

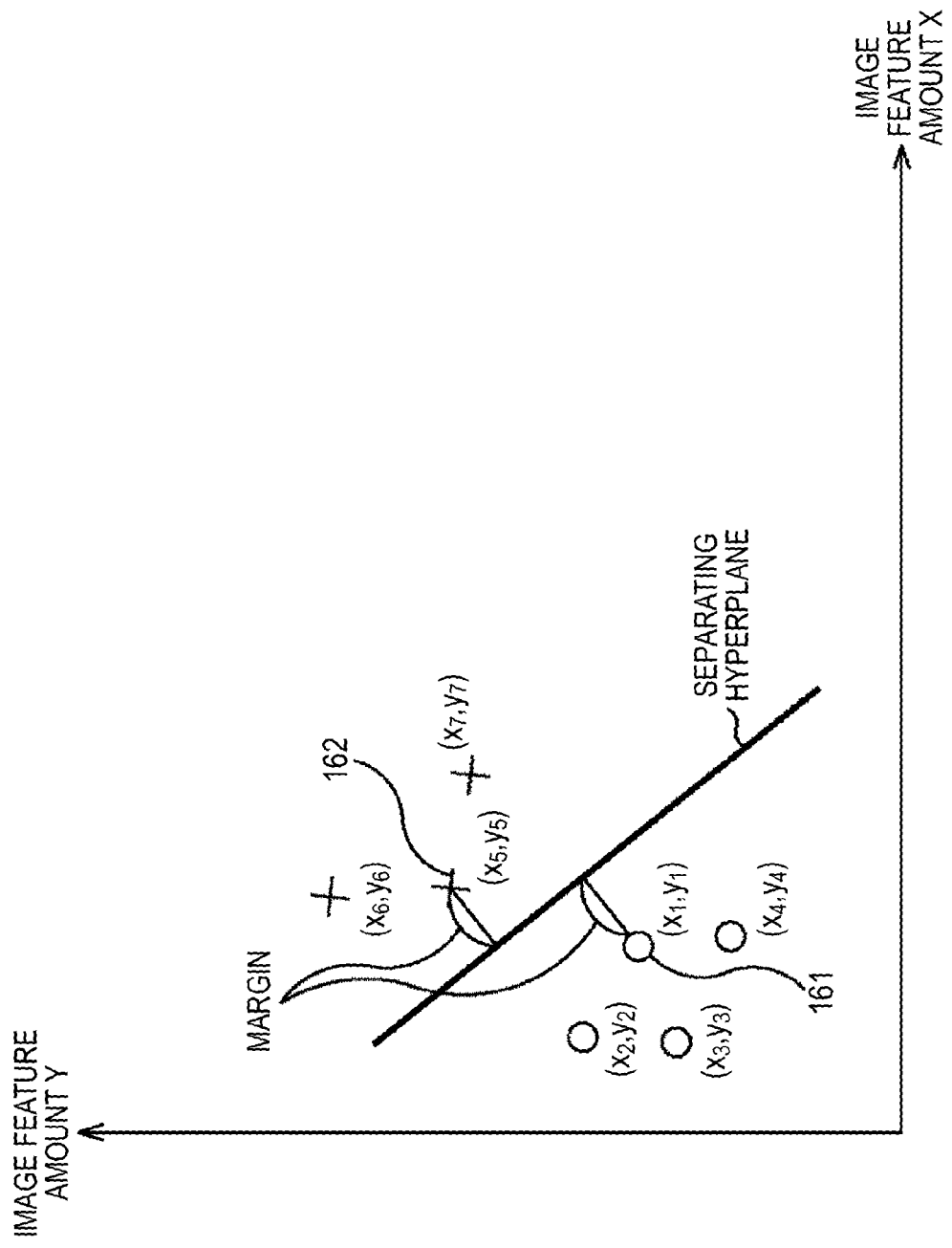

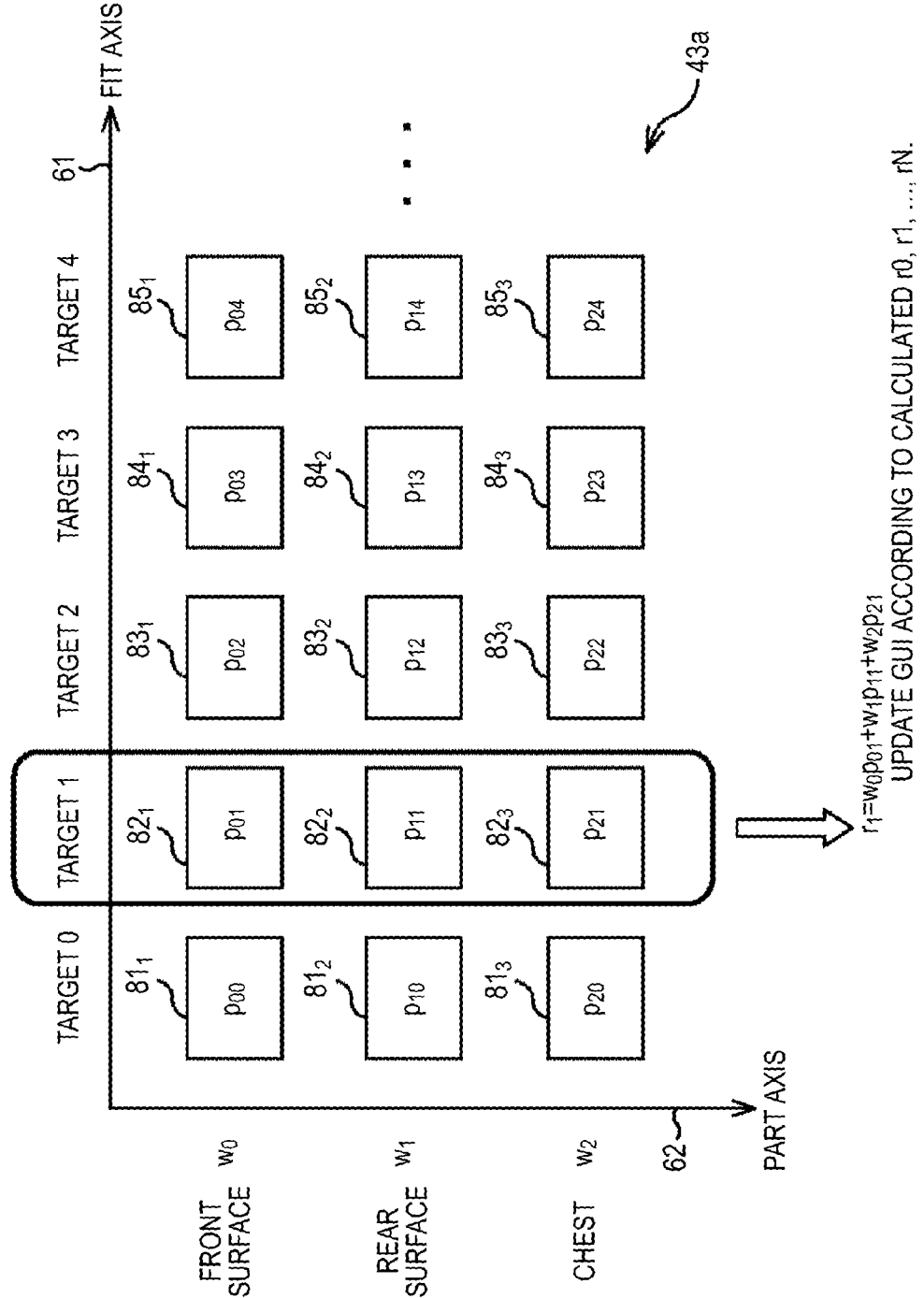

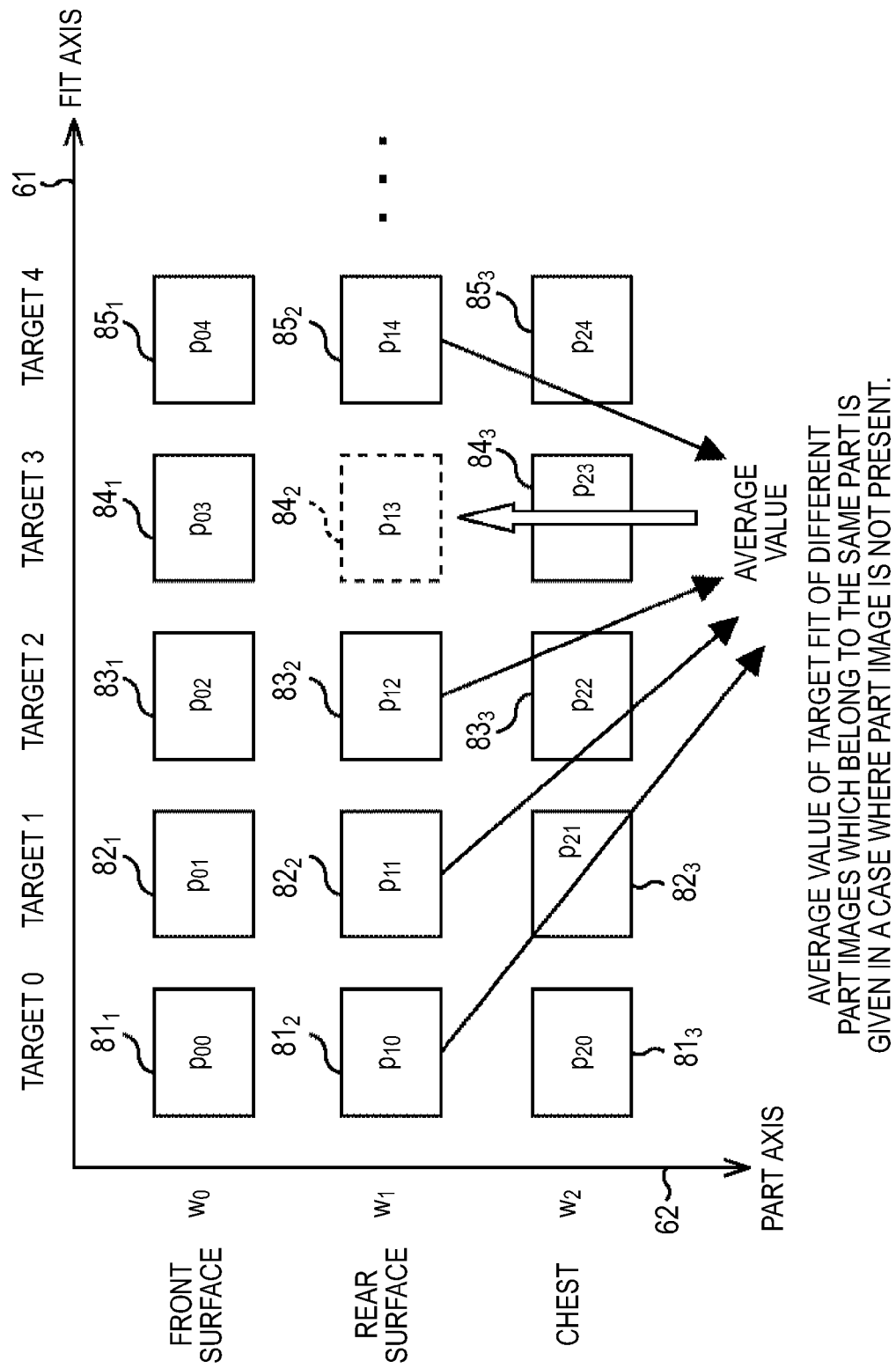

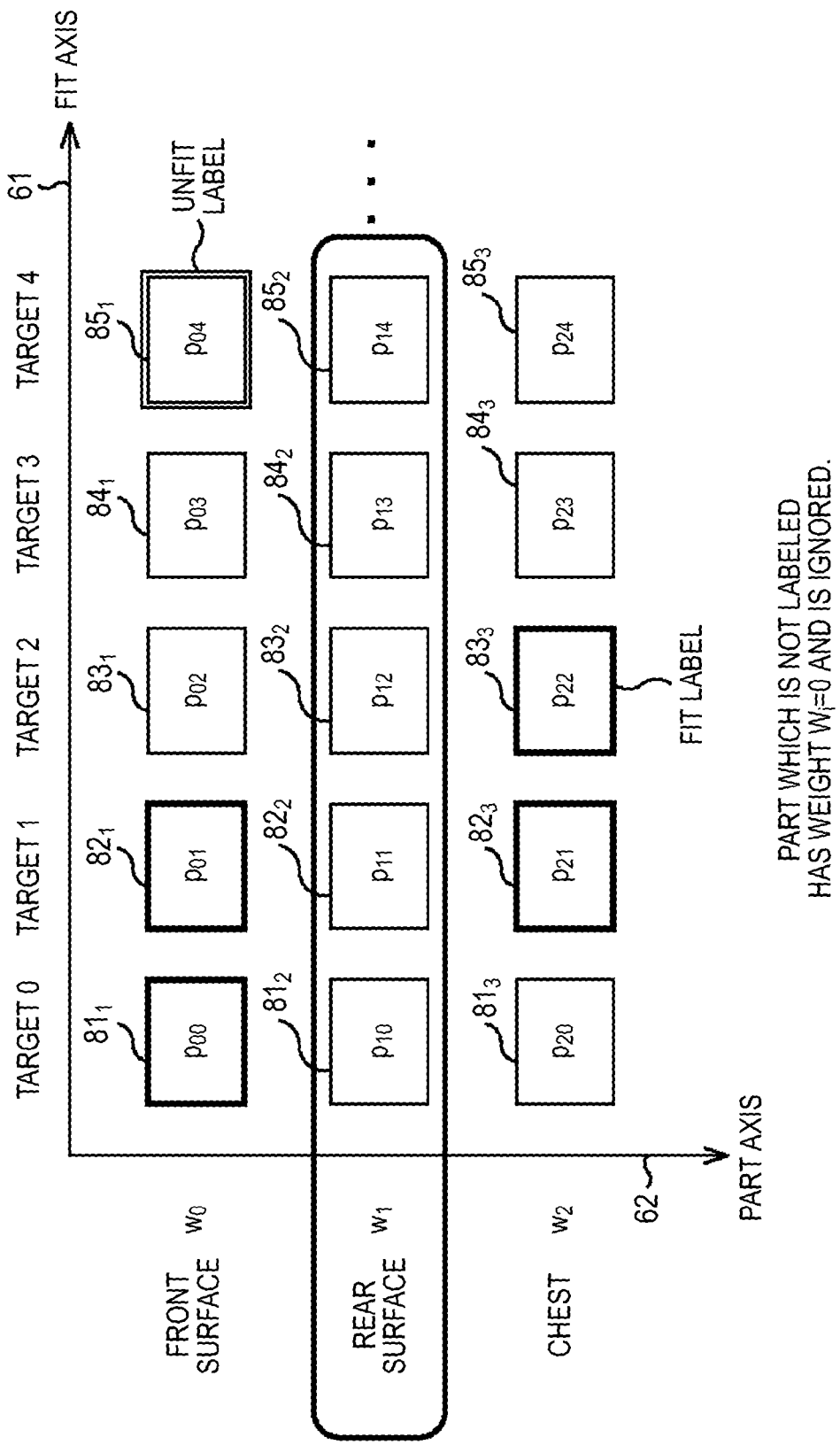

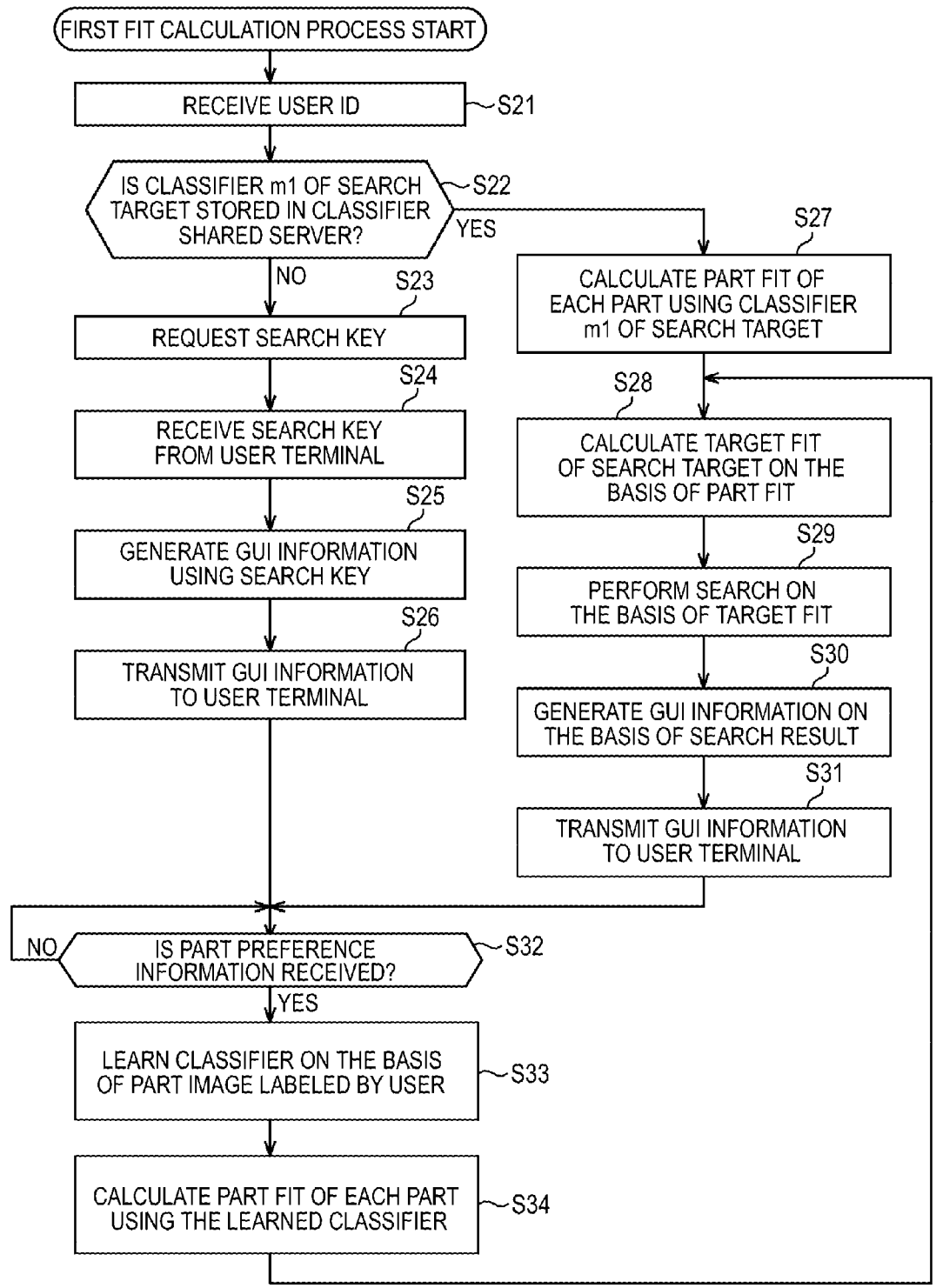

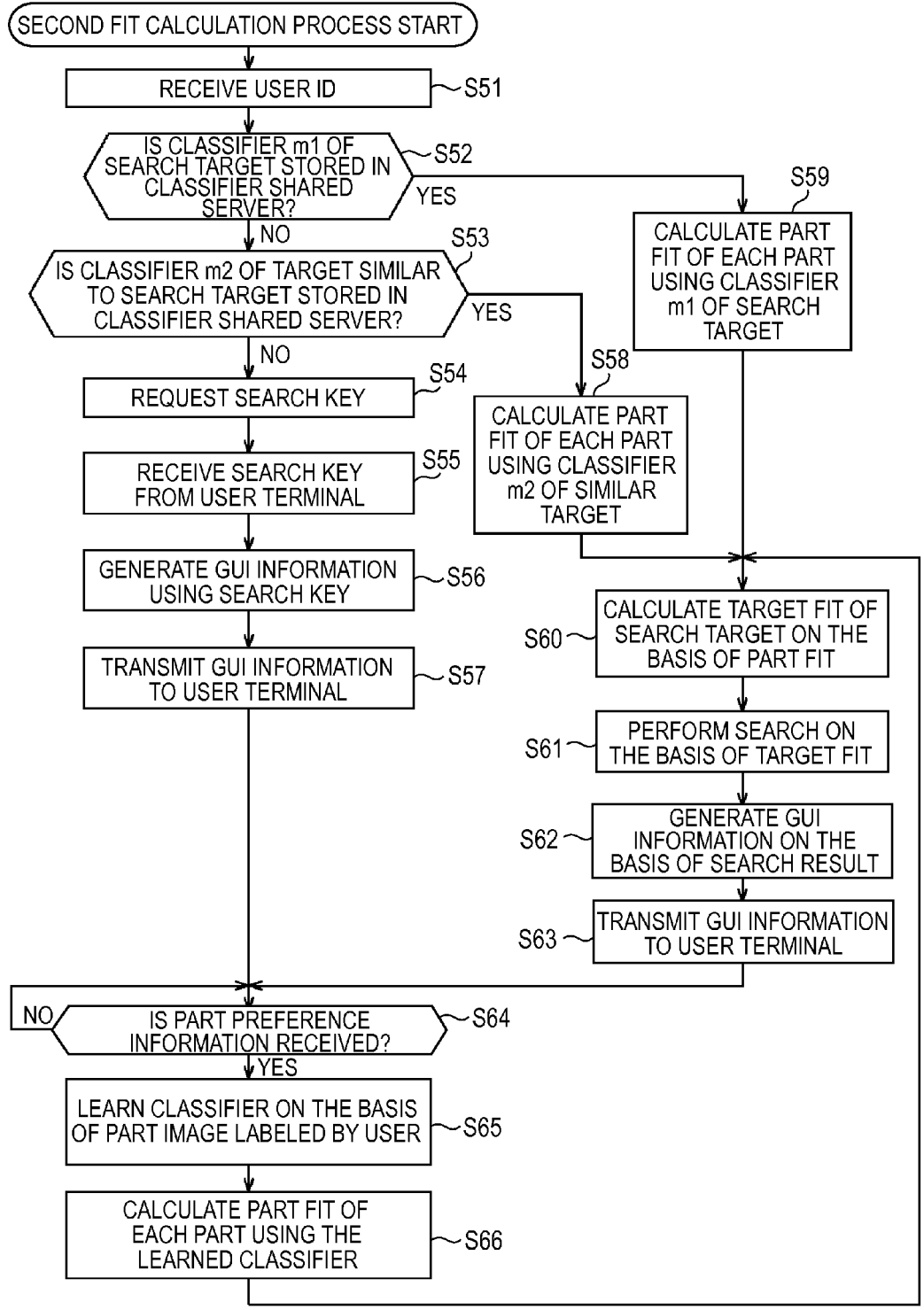

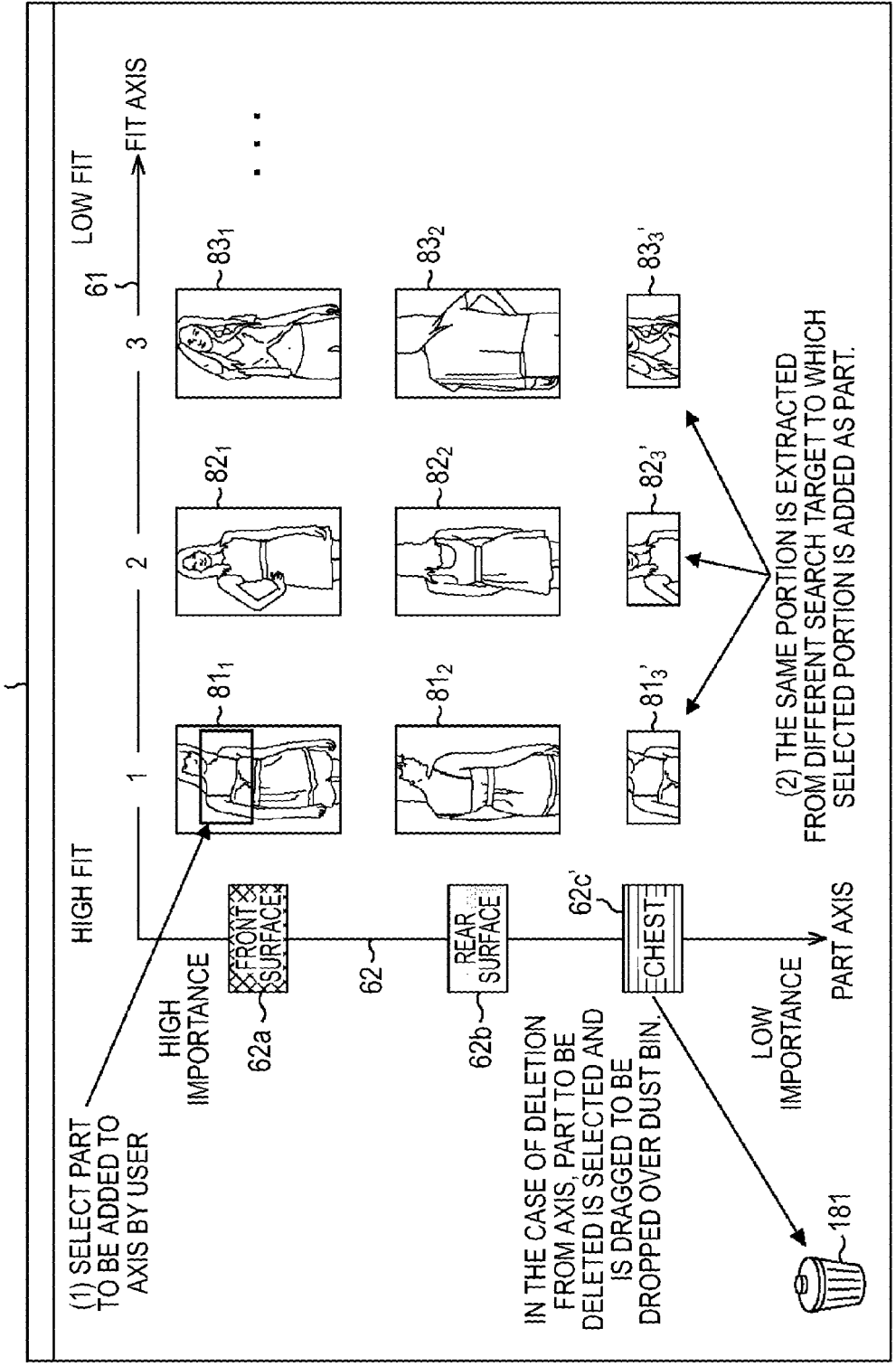

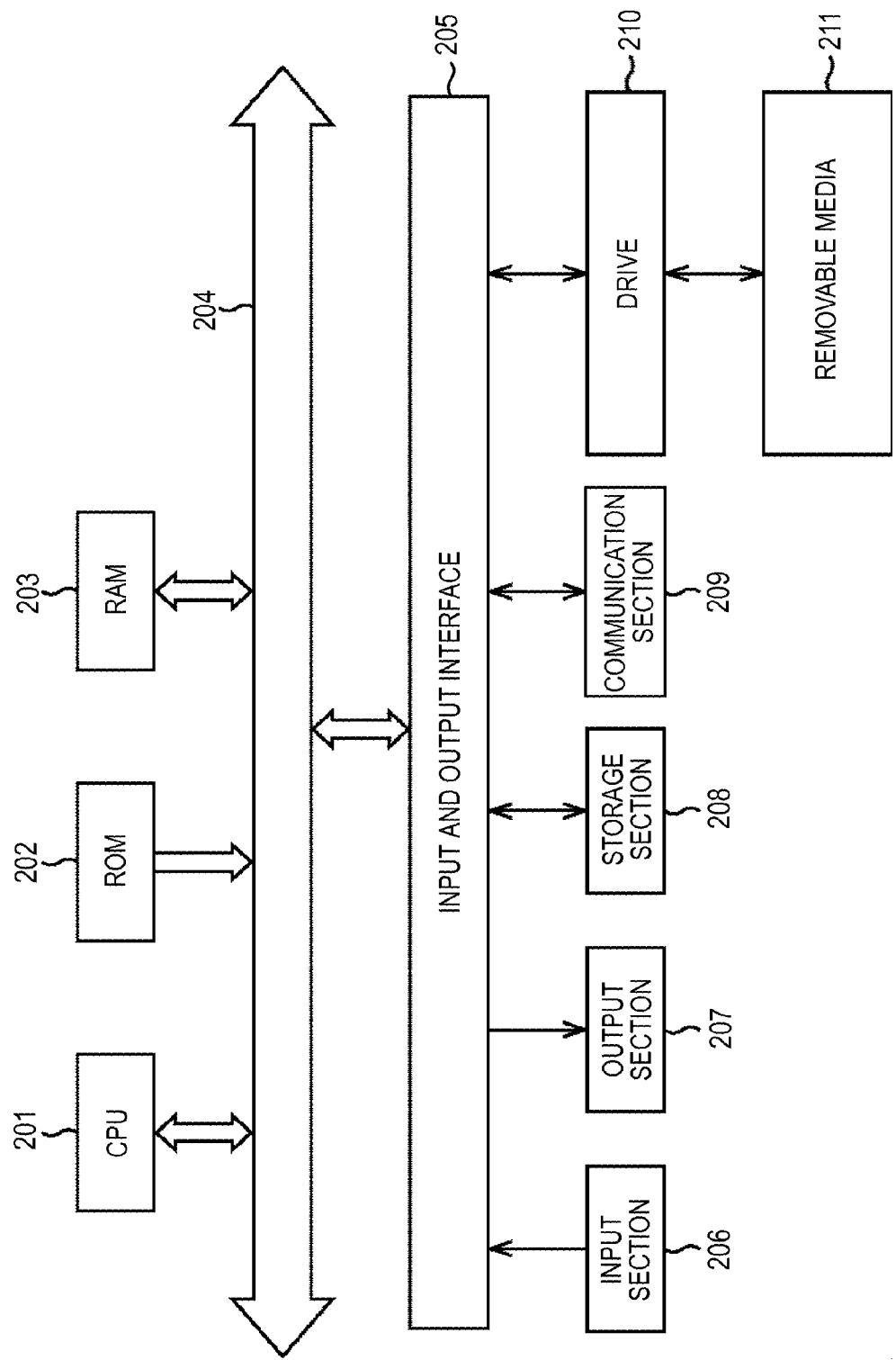

DISPLAY CONTROL DEVICE, DISPLAY CONTROL METHOD, SEARCH DEVICE, SEARCH METHOD, PROGRAM AND COMMUNICATION SYSTEM

CROSS-REFERENCE TO RELATED APPLICATIONS

This application is a continuation of U.S. application Ser. No. 13/396,911 filed Feb. 15, 2012, which claims priority from Japanese Patent Application No. 2011-035886 filed in the Japan Patent Office on Feb. 22, 2011, and Japanese Patent Application No. 2011-035887 filed on Feb. 22, 2011, the entire contents of which are hereby incorporated by reference.

FIELD

The present disclosure relates to a display control device, a display control method, a search device, a search method, a program and a communication system, and more particularly, to a display control device, a display control method, a search device, a search method, a program and a communication system which are capable of providing a desired search result to a user on the basis of a small amount of feedback of the user, for example.

BACKGROUND

For example, an image search system exists in which an image desired by a user (hereinafter, referred to as a desired image) is retrieved from a plurality of images stored in a large capacity recording medium (for example, a hard disk or the like).

In this image search system, the user selects an inquiry image which is most similar to the desired image from a plurality of inquiry images presented by the image search system. Further, the image search system presents an image having an image feature amount which is closest to an image feature amount of the selected inquiry image among a plurality of images to the user as the desired image which is most similar to the selected inquiry image.

However, in this image search system, in a case where a semantic gap is large, it is difficult to provide the search result which the user desires. Here, the semantic gap refers to a difference generated between an image feature amount used for searching the desired image and a concept used when a person actually recognizes the desired image.

That is, in a case where a large gap is present between the similarity of images determined by a person and the similarity of images determined by the image search system, it is difficult to provide the desired image as the search result in the image search system.

In this regard, a classifier search technique exists which searches a desired image, for example, using a classifier which performs search to match recognition that a person is capable of, in order to reduce a semantic gap. The classifier is generated in advance by performing statistic learning as teacher data of a large amount of image data obtained by adding a label indicating the similarity to the desired image by a person.

According to this classifier, it is possible to reduce the semantic gap and to obtain a search result relatively desired by a user.

However, according to the above-described classifier, in a case where a plurality of users selects the same inquiry image, the same search result is provided to all the users, which may not be a desired search result to all the plurality of users.

This is because the similarities of images determined by the plurality of different users are different from each other. That is, for example, a first user may feel that the selected inquiry image is similar to an image Q1 and an image Q2 but is not similar to an image Q3. On the other hand, a second user different from the first user may feel that the selected inquiry image is similar to the image Q1 and the image Q3 but is not similar to the image Q2.

In this regard, a fit feedback technique has been proposed which enhances the search accuracy of a desired image by generating a classifier which matches user recognition on the basis of feedback from a user, for each user (for example, refer to JP-A-10-40268, JP-A-2003-228581 and JP-A-2008-276775).

SUMMARY

In the fit feedback technique as described above, the feedback of a predetermined amount or more should be performed in order to enhance the search accuracy of the desired image on the basis of the feedback from the user.

Thus, there is a need for the user to perform feedback of the predetermined amount or more for the image search system, which is bothersome for the user.

Further, for example, in a case where the feedback from the user does not reach the predetermined amount, it is difficult to enhance the search accuracy of the desired image.

Accordingly, it is desirable to provide a technique which is capable of searching a desired search target from a plurality of search targets with high accuracy even in a case where the amount of the feedback from the user is small.

In accordance with one embodiment, an information processing apparatus may include a control unit to control display of parts information of a plurality of items, to generate search information according to feedback from a user for the parts information, and to control display of a search result according to the search information.

In accordance with another embodiment, a search device may include a control unit to control a search of some items based on feedback information from a user for displayed parts information of a plurality of items, where the feedback information indicates whether a part information of at least one of the items is fit for a user preference.

In accordance with another embodiment, a method of information processing may include controlling, by a processor, display of parts information of a plurality of items, to generate search information according to feedback from a user for the parts information, and display of a search result according to the search information.

In accordance with another embodiment, a method of search may include controlling, by a processor, a search of some items based on feedback information from a user for displayed parts information of a plurality of items, where the feedback information indicates whether a part information of at least one of the items is fit for a user preference.

In accordance with another embodiment, a non-transitory recording medium may be recorded with a computer readable program executable by a computer. The program may include controlling display of parts information of a plurality of items, to generate search information according to feedback from a user for the parts information, and display of a search result according to the search information.

BRIEF DESCRIPTION OF THE DRAWINGS

FIG. 2 is a diagram illustrating an example of a table stored in a classifier shared server;

FIG. 8 is a diagram illustrating statistic learning of a classifier using an SVM;

FIG. 9 is a diagram illustrating an example of a calculating method of a target fit;

FIG. 10 is a diagram illustrating an example of a calculating method of a part fit when a part image is not present;

FIG. 11 is a diagram illustrating an example when a weight multiplied by part fit is changed;

FIG. 12 is a flowchart illustrating an example of a first fit calculation process performed by a shop server;

FIG. 13 is a flowchart illustrating an example of a second fit calculation process performed by a shop server;

FIG. 14 is a diagram illustrating an example of a display screen when a part is added or deleted; and FIG. 15 is a block diagram illustrating an example of a configuration of a computer.

DETAILED DESCRIPTION

Hereinafter, mode of implementing the present disclosure (hereinafter, referred to as embodiment) will be described in the following order.

1. Present embodiment (example when a product is purchased from an internet site)
2. Modification

1. Present Embodiment

Configuration Example of Communication System 1

Figure 1:
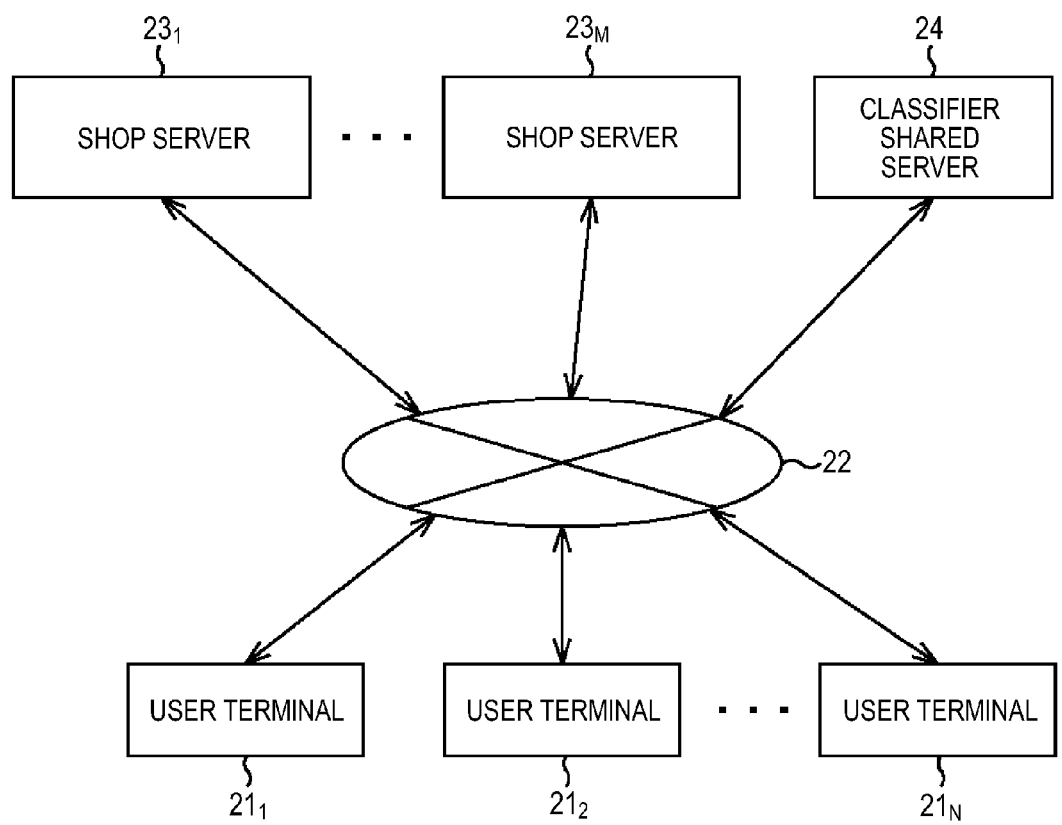
FIG. 1 is a block diagram illustrating an example of a configuration of a communication system according to an embodiment of the present disclosure.

FIG. 1 illustrates a configuration example of a communication system 1 according to the present embodiment.

The communication system 1 includes user terminals $21_1$ to $21_N$, a network 22 such as the Internet, shop servers $23_1$ to $23_M$, and a classifier shared server 24.

Hereinafter, in a case where it is not necessary to distinguish the respective user terminals $21_1$ to $21_N$, the user terminal is simply referred to as a user terminal $21_n$. Further, in a case where it is not necessary to distinguish the respective shop servers $23_1$ to $23_M$, the shop server is simply referred to as a shop server $23_m$.

The user terminal $21_n$ receives GUI (Graphical User Interface) information from the shop server $23_m$, as the user terminal $21_n$ accesses the shop server $23_m$ through the network 22. Further, the user terminal $21_n$ displays a part image indicating each part of products (for example, clothes or the like) which are available in the shop server $23_m$, on the basis of the GUI information from the shop server $23_m$. The GUI information refers to information for controlling a display by the user terminal $21_n$.

Further, the user terminal $21_n$ generates part preference information indicating a user preference for each part according to a feedback operation of a user, and feeds back the part preference information to the shop server $23_m$ through the network 22. Details about the user terminal $21_n$ will be described later with reference to FIGS. 3 to 6.

The shop server $23_m$ is a server which serves as an internet shop for product sale, for example. The shop server $23_m$ generates GUI information for displaying a part image for each of a plurality of products for sale according to access from the user terminal $21_n$, and supplies the generated GUI information to the user terminal $21_n$ through the network 22, for example.

Further, the shop server $23_m$ searches a user desired product (for example, a product or the like which a user wants to purchase) from the plurality of products, on the basis of the part preference information from the user terminal $21_n$.

That is, for example, the shop server $23_m$ generates a classifier for classifying whether each product is fit for the user preference, on the basis of the part preference information from the user terminal $21_n$, and searches the user desired product on the basis of the generated classifier.

Further, the shop server $23_m$ generates GUI information for displaying the search result obtained by the search, and supplies the result to the user terminal $21_n$ through the network 22.

Further, the shop server $23_m$ shares the classifier with a different shop server $23_m'$, for example. Details about the shop server $23_m$ will be described later with reference to FIGS. 7 to 13.

The classifier shared server 24 is connected to, for example, the shop servers $23_1$ to $23_M$ through the network 22. Here, the classifier shared server 24 may be included as a component of an arbitrary shop server $23_m$.

The classifier shared server 24 stores (retains) the classifier generated by the shop server $23_m$, for example. The classifier stored in the classifier shared server 24 is appropriately shared with the plurality of shop servers $23_m$.

That is, for example, the classifier shared server 24 stores a table 24a in which a classifier for searching the desired product from the plurality of products which are targets for search is related to each user ID for uniquely classifying each user of the user terminal $21_n$, as shown in FIG. 2.

Next, FIG. 2 illustrates an example of the table 24a stored in the classifier shared server 24.

For example, a classifier m1 generated in a shop server $23_{m1}$ that specializes in selling cute-style dresses, a classifier m2 generated in a shop server $23_{m2}$ that specializes in selling adult-style dresses, a classifier m3 generated in a shop server $23_{m3}$ that specializes in selling cute camisoles, and the like, which are related to a user ID "user1" for uniquely classifying a first user, are stored in the table 24a.

Further, for example, a classifier m1' generated in a shop server $23_{m1'}$ that specializes in selling cute dresses, a classifier m2' generated in a shop server $23_{m2'}$ that specializes in selling adult-style dresses, and a classifier m3' generated in a shop server $23_{m3'}$ that specializes in selling cute-style camisoles, which are related to a user ID "user2" for uniquely classifying a second user different from the first user, are stored in the table 24a.

The classifier m1 searches a product desired by the first user from the plurality of products "cute dresses" which are search targets, and is shared between the shop servers $23_{m1}$ and $23_{m1'}$ that specialize in selling the "cute-style dresses", for example.

Specifically, for example, the shop server $23_{m1}$ or $23_{m1'}$ each performs search on the basis of the classifier m1 stored in the classifier shared server 24, according to access from the user terminal $21_n$ of the first user.

Further, in a case where a classifier is newly generated on the basis of feedback from the user terminal $21_n$, the shop server $23_{m1}$ or $23_{m1'}$ supplies the newly generated classifier to the classifier shared server 24 through the network 22, and stores the newly generated classifier as the classifier m1 through overwriting.

Similarly, the classifier m2 searches a product desired by the first user from the plurality of products "adult dresses" which are search targets, and is shared between the shop servers $23_{m2}$ and $23_{m2'}$ that specialize in selling "adult-sized dresses", for example. Further, the classifier m3 searches a product desired by the first user from the plurality of products "cute camisoles" which are search targets, and is shared between the shop servers $23_{m3}$ and $23_{m3'}$ that specialize in selling "cute-style camisoles", for example. This is applied to the classifiers m1', m2', and m3', in a similar way.

For example, a sharing method of sharing the classifier m1 between the shop server $23_{m1}$ and the shop server $23_{m1'}$ will be described later with reference to a flowchart in FIG. 12. Further, a different sharing method other than the sharing method of the classifier described with reference to FIG. 12 will be described later with reference to a flowchart of FIG. 13.

[Configuration Example of User Terminal $21_n$]

Figure 3:
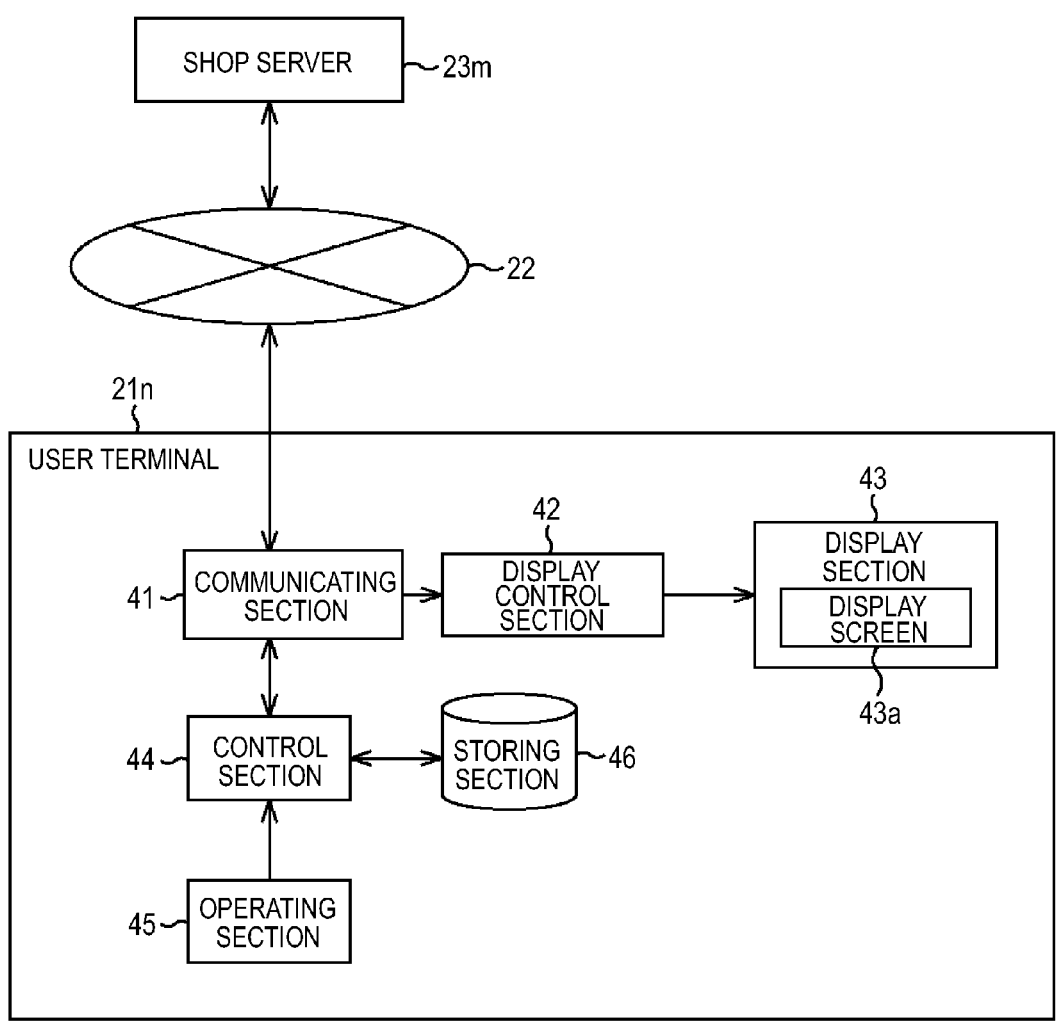
FIG. 3 is a block diagram illustrating an example of a configuration of a user terminal.

FIG. 3 illustrates a configuration example of the user terminal $21_n$.

The user terminal $21_n$ includes a communicating section 41, a display control section 42, a display section 43 having a display screen 43a, a control section 44, an operating section 45 and a storing section 46.

The communicating section 41 supplies the GUI information which is supplied from the shop server $23_m$ through the network 22 to the display control section 42.

Further, the communicating section 41 supplies the part preference information from the control section 44, to the shop server $23_m$ through the network 22.

The display control section 42 displays a part image of each product, for example, as a purchase screen display referenced by a user in product purchasing, on the display screen 43a of the display section 43, on the basis of the GUI information from the communicating section 41. Details about the purchase screen display displayed on the display screen 43a will be described later with reference to FIG. 4.

Further, the display control section 42 displays a check box or the like for receiving a feedback operation from the user, in addition to the plurality of part images, for example, as a feedback screen display referenced by the user when the feedback operation is performed, on the display screen 43a of the display section 43, under the control of the control section 44. Details about the feedback screen display displayed on the display screen 43a will be described later with reference to FIG. 5.

The display section 43 is an LCD (Liquid Crystal Display) or the like, and displays the plurality of part images or the check box or the like on the display screen 43a under the control of the display control section 42.

As shown in FIG. 3, the display section 43 may be a component of the user terminal $21_n$, or may be independently installed without being included as the component of the user terminal $21_n$. In this case, the display control section 42 in the user terminal $21_n$ and the display section 43 which is installed outside the user terminal $21_n$ are connected through a cable or the like, for example.

The control section 44 controls the communication section 41 and the display control section 42 by executing a control program which is stored in advance in the storing section 46, for example. Further, for example, the control section 44 generates the part preference information on the basis of an operation signal from the operating section 45, and then supplies the result to the communicating section 41.

The operating section 45 includes buttons or the like operated by the user. For example, as a feedback operation is performed by the user, the operating section 45 supplies an operation signal corresponding to the feedback operation to the control section 44.

The storing section 46 stores in advance the control program or the like to be executed by the control section 44. Further, for example, the storing section 46 stores a user ID of a user who uses the user terminal $21_n$ or different data.

[One Example of Display Screen of Display Section 43]

Figure 4:
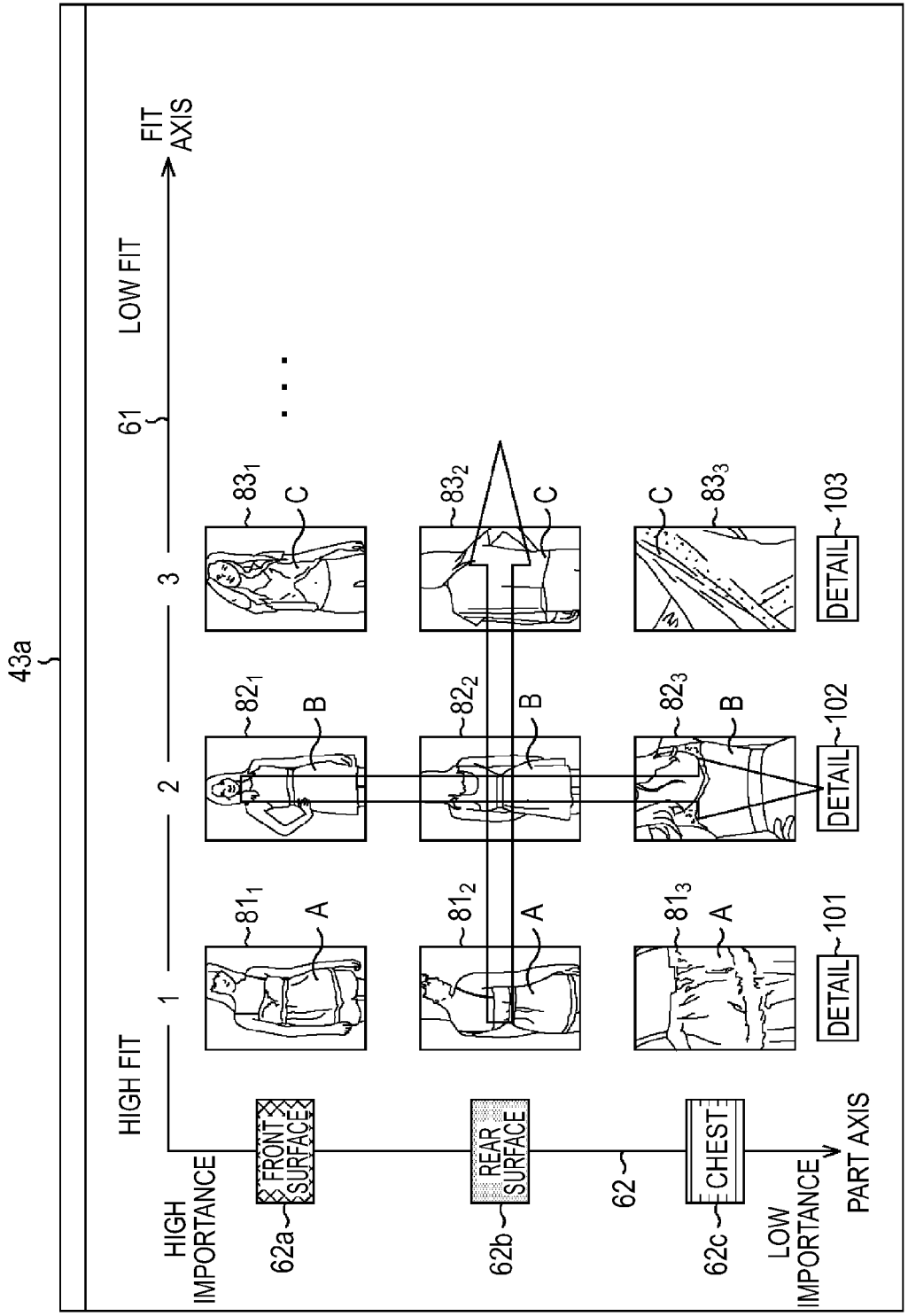
FIG. 4 is a diagram illustrating an example of a display screen referenced at the time of product purchase.

Next, FIG. 4 illustrates a display example of the display screen 43a when the purchase screen display referenced in product purchasing is displayed.

On the display screen 43a, a plurality of part informations, such as part images $81_1$, $81_2$, $81_3$, $82_1$, $82_2$, $82_3$, $83_1$, $83_2$, $83_3$, . . . , in which each part of clothes A, B, C, . . . is displayed as a product is disposed in a matrix format, on the basis of a fit axis 61 and a part axis 62 (which will be described later). As the part information, for example, a part image, such as an imaged image obtained by imaging each part, a thumbnail image obtained by reducing the imaged image, or the like is employed, or a part text, such as one more text characters the like is employed.

Here, the fit axis 61 represents a target fit which is the level of fit between each of the plurality of clothes and the user preference by a fit order 1, 2, 3, and so on. This fit order is high as the target fit is high.

Further, the part axis 62 represents a name of each part of the clothes, for example. For example, a front surface 62a, a rear surface 62b and a chest 62c are sequentially disposed from the top, in the order of parts which are importantly considered in purchase of the clothes on the part axis 62. The order of the parts may be changed according to the user's operation. Further, the name of each part may be added or deleted according to the user operation. Addition or deletion of the name according to the user operation will be described later with reference to FIG. 14.

On the display screen 43a in FIG. 4, the part images $81_1$, $81_2$ and $81_3$ and a detail button 101 of the clothes A ranked as number one in the fit order are disposed in parallel, in a lower direction (in the figure) from the fit order "1" on the fit axis 61. The detail button 101 is operated when detailed information of the clothes A (for example, the size, cost or the like of the clothes) is to be displayed.

Similarly, on the display screen 43a in FIG. 4, for example, the part images $82_1$, $82_2$ and $82_3$ and a detail button 102 of the clothes B ranked as number two in the fit order are disposed in parallel, in a lower direction (in the figure) from the fit order "2" on the fit axis 61. Further, the part images $83_1$, $83_2$ and $83_3$ and a detail button 103 of the clothes C ranked as number three in the fit order are disposed in parallel, in a lower direction (in the figure) from the fit order "3" on the fit axis 61.

Further, on the display screen 43a in FIG. 4, the part images $81_1$, $82_1$ and $83_1$ which display a part of each front surface portion of the clothes A, B, C and so on are disposed in a right direction (in the figure) from the front surface 62a on the part axis 62. Further, the part images 81$_2$, 82$_2$ and 83$_2$ which display a part of each rear surface portion of the clothes A, B, C and so on are disposed in a right direction (in the figure) from the rear surface 62$b$ on the part axis 62. Further, the part images 81$_3$, 82$_3$ and 83$_3$ which display a part of each chest portion of the clothes A, B, C and so on are disposed in a right direction (in the figure) from the chest 62$c$ on the part axis 62.

For example, the user may perform a pressing operation of pressing the detail button 101 using the operating section 45 so that detailed information about the clothes A corresponding thereto can be displayed. This is similarly applied to the detail buttons 102 and 103.

Further, when the user finds clothes that fit the user preference (for example, satisfactory clothes) by referring to the detailed information or the part images, the user can perform a procedure of purchasing the clothes on the display screen 43$a$.

As shown in FIG. 4, the plurality of image parts 81$_1$, 81$_2$, 81$_3$, 82$_1$, 82$_2$, 82$_3$, 83$_1$, 83$_2$, 83$_3$ and so on are displayed on the display screen 43$a$, but a display method of the image parts is not limited thereto.

That is, for example, among the plurality of part images shown in FIG. 4, only part images of a predetermined number may be displayed on the display screen 43$a$. In this case, in order to display the part images which are not displayed on the display screen 43$a$ on the display screen 43$a$, a scroll bar, a page sending button or the like for displaying the next part image is installed.

Further, for example, on the display screen 43$a$, instead of the scroll bar, the part image may be slid (moved) in the right and left directions (in the figure) for the part image of each part. However, in this case, for example, since the part image of which the fit order is not "1" may be displayed below the fit order "1" on the fit axis 61 due to the sliding of the part image, it is preferable that the fit order on the fit axis 61 be added to each part image to be displayed.

Further, for example, as shown in FIG. 4, a configuration may be employed in which part images corresponding to the fit orders 1, 2, 3 on the fit axis 61 and so on are all displayed on the display screen 43$a$, and only the part image corresponding to the fit order n is displayed.

Further, for example, as shown in FIG. 4, all of the part images corresponding to names of the respective parts on the part axis 62 may be displayed on the display screen 43$a$, or only the part images corresponding to the name of an arbitrary part may be displayed.

Further, for example, as shown in FIG. 4, the fit axis 61 and the part axis 62 are displayed on the display screen 43$a$, but at least one of the fit axis 61 and the part axis 62 may not be displayed.

The above-described part image display and the display of the fit axis 61 and the part axis 62 may be changed according to a user operation.

[User Feedback]

Figure 5:
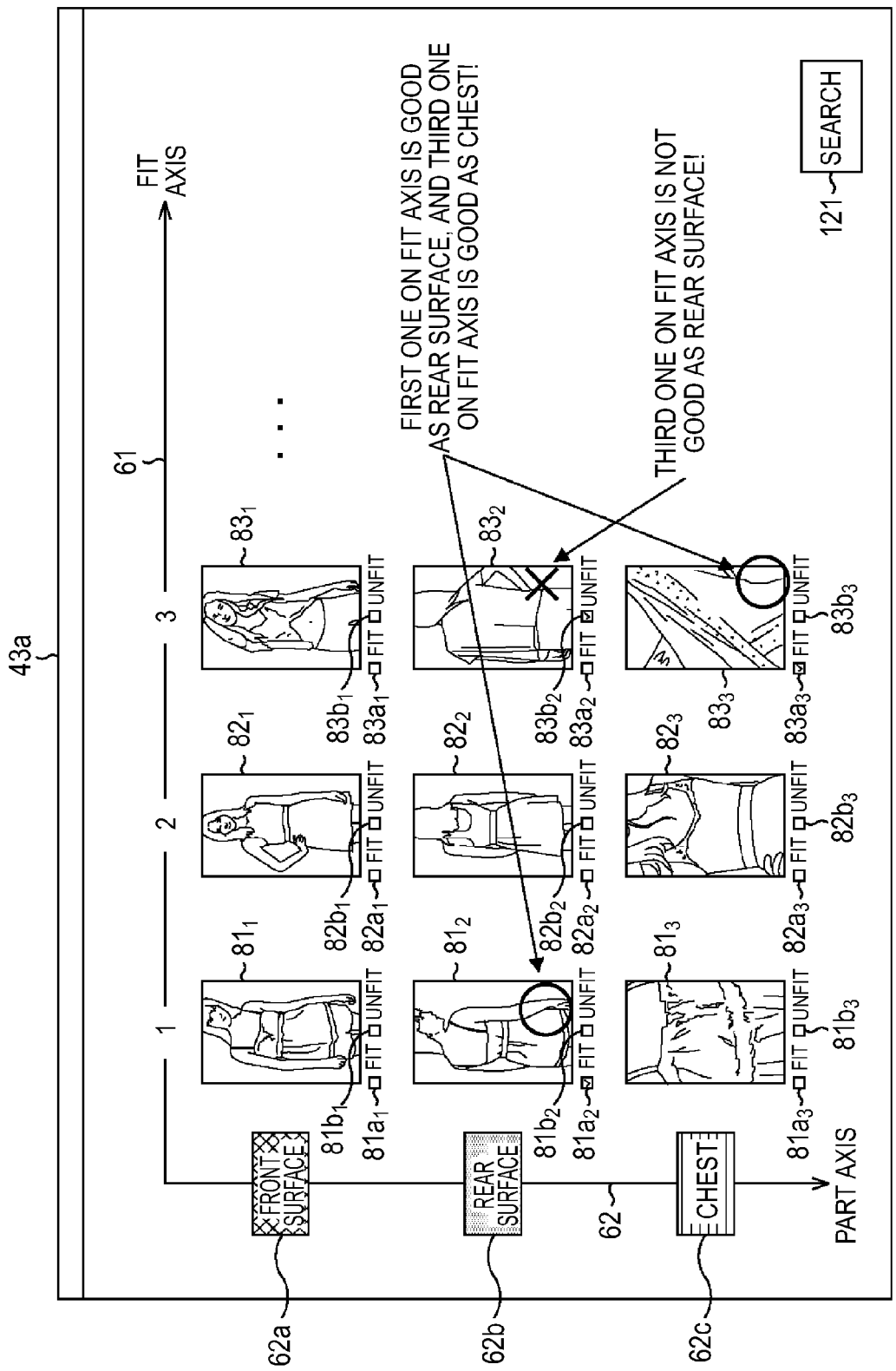
FIG. 5 is a diagram illustrating an example of a display screen referenced at the time of feedback.

Next, FIG. 5 illustrates a display example of the display screen 43$a$ when the feedback screen referenced when the feedback operation is performed by the user is displayed.

Since the same reference numerals are given to the same components of the display screen 43$a$ in FIG. 5 as the display screen 43$a$ in FIG. 4, detailed description thereof will be appropriately omitted.

That is, the display screen 43$a$ in FIG. 5 is the same as the display screen 43$a$ in FIG. 4 except that check boxes operated by the feedback operation of the user are disposed under each part image, and a search button 121 is disposed in a right lower section thereof, instead of the detail buttons 101 to 103.

Under the part image 81$_1$, a fit box 81$a_1$ and an unfit box 81$b_1$ are disposed as the check boxes. The fit box 81$a_1$ is operated to add a fit label indicating that a part displayed in the part image 81$_1$ is fit for the user preference to the part image 81$_1$. Further, the unfit box 81$b_1$ is operated to add an unfit label indicating that a part displayed in the part image 81$_1$ is unfit for the user preference to the part image 81$_1$.

With respect to other part images, the fit box and the unfit box are disposed in the same way as in the part image 81$_1$.

That is, for example, a fit box 81$a_2$ and an unfit box 81$b_2$ are disposed under the part image 81$_2$, and a fit box 81$a_3$ and an unfit box 81$b_3$ are disposed under the part image 81$_3$, respectively. Further, a fit box 82$a_1$ and an unfit box 82$b_1$ are disposed under the part image 82$_1$, and a fit box 82$a_2$ and an unfit box 82$b_2$ are disposed under the part image 82$_2$, and a fit box 82$a_3$ and an unfit box 82$b_3$ are disposed under the part image 82$_3$, respectively. Further, a fit box 83$a_1$ and an unfit box 83$b_1$ are disposed under the part image 83$_1$, and a fit box 83$a_2$ and an unfit box 83$b_2$ are disposed under the part image 83$_2$, and a fit box 83$a_3$ and an unfit box 83$b_3$ are disposed under the part image 83$_3$, respectively.

The user performs the feedback operation of assigning at least one of the fit label and the unfit label using the part in the part image displayed on the display screen 43$a$ as a target, using the operating section 45.

That is, for example, in the case shown in FIG. 5, the user is interested in purchasing the clothes including the part on the part image 81$_2$ and the part on the part image 83$_3$.

Accordingly, as shown in FIG. 5, the user performs the feedback operation of checking the fit box 81$a_2$ of the part image 81$_2$ and the fit box 83$a_3$ of the part image 83$_3$, respectively.

Further, for example, the user may not be interested in purchasing of the clothes including the part on the part image 83$_2$.

Accordingly, as shown in FIG. 5, the user performs the feedback operation of checking the unfit box 83$b_2$ of the part image 83$_2$.

Further, in a state where the fit box 81$a_2$, the fit box 83$a_3$ and the unfit box 83$b_2$ are checked, the user performs a pressing operation of pressing the search button 121 using the operating section 45.

According to the feedback operation or the pressing operation from the user, the operating section 45 supplies an operation signal corresponding thereto to the control section 44. Further, the control section 44 generates part preference information indicating that the fit labels are added to the part image 81$_2$ and the part image 83$_3$, and the unfit label is added to the part image 83$_2$, on the basis of the operation signal from the operating section 45, and supplies the part preference information to the communicating section 41. The communicating section 41 supplies the part preference information from the control section 44 to the shop server 23$_m$ through the network 22.

The shop server 23$_m$ generates a classifier on the basis of the part preference information supplied from the communicating section 41 through the network 22. Further, the shop server 23$_m$ searches a product desired by the user (for example, a product which the user wants to purchase), on the basis of the generated classifier.

[Operation of User Terminal 21$_n$]

Figure 6:
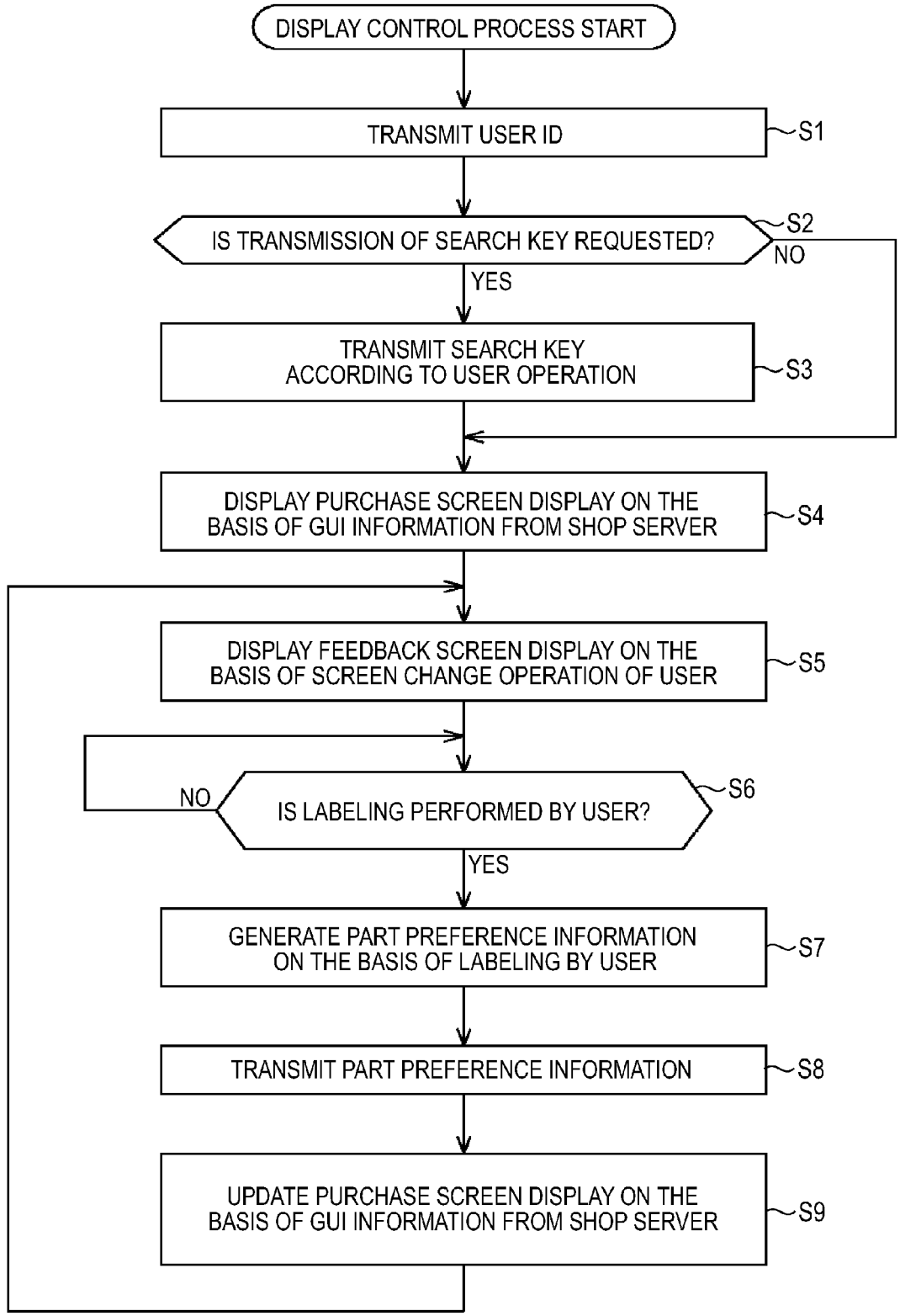
FIG. 6 is a flowchart illustrating an example of a display control process performed by a user terminal.

Next, a display control process performed by the user terminal 21$_n$ will be described with reference to a flowchart of FIG. 6.

For example, the display control process is started when an operation is performed in which a user browses a product which is sold in the shop server $23_m$ which serves as an internet shop using the operating section 45 on the display screen 43a. At this time, the control section 44 reads the user ID stored in the storing section 46 according to the operation signal from the operating section 45 and supplies the user ID to the communicating section 41.

Further, in step S1, the communicating section 41 transmits the user ID from the control section 44 to the shop server $23_m$ through the network 22, under the control of the control section 44.

In this regard, the shop server $23_m$ determines whether a classifier (hereinafter, also referred to as a "search target classifier") for searching a desired product from the plurality of products which are search targets is present in the classifier shared server 24, using the user ID supplied from the communicating section 41 through the network 22.

The shop server $23_m$ performs the search using the search target classifier in a case where it is determined that the search target classifier is present in the classifier shared server 24. Further, the shop server $23_m$ generates GUI information indicating a search result obtained as a result of the search, and supplies the GUI information to the communicating section 41 through the network 22.

Further, in a case where it is determined that the search target classifier is not present in the classifier shared server 24, the shop server $23_m$ transmits a request signal which requires transmission of a search key used for searching the product to the communicating section 41 through the network 22.

In step S2, the communicating section 41 determines whether the transmission of the search key is required, that is, whether the request signal is received or the GUI information is received from the shop server $23_m$ through the network 22, according to the user ID transmission.

In step S2, in a case where it is determined that the request signal is received from the shop server $23_m$ through the network 22, the communicating section 41 supplies the received request signal to the control section 44, and then the routine proceeds to step S3.

In step S3, the control section 44 controls the display control section 42 to display an input screen display which demands a search key input on the display screen 43a of the display section 43. As the search key, an inquiry image, which is input (selected) by the user, indicating that it is a product similar to a desired product among a plurality of inquiry images presented to the user terminal $21_n$, a keyword, which is input by the user, relating to the desired product, or the like is employed.

Further, as the user performs the input operation of inputting the search key using the operating section 45, the operating section 45 supplies the operation signal corresponding to the input operation of the user to the control section 44.

The control section 44 discerns the search key on the basis of the operation signal from the operating section 45, and supplies the result to the communicating section 41. The communicating section 41 transmits the search key from the control section 44 to the shop server $23_m$ through the network 22.

In this regard, the shop server $23_m$ performs search on the basis of the search key supplied from the communicating section 41 through the network 22. Here, in a case where the search key is the inquiry image, the shop server $23_m$ performs the search on the basis of an image feature amount of the inquiry image, and in a case where the search key is the keyword, the shop server $23_m$ performs the search using the keyword as meta information.

The shop server $23_m$ generates the GUI information for displaying the search result obtained by the search, and supplies the result to the communicating section 41 through the network 22.

Further, the communicating section 41 supplies the GUI information supplied from the shop server $23_m$ through the network 22 to the display control section 42, and then allows the routine to proceed to step S4.

Further, in step S2, in a case where it is determined that the transmission of the search key is not required, that is, in a case where the GUP information is received from the shop server $23_m$ through the network 22, the communicating section 41 supplies the received GUI information to the display control section 42, and then allows the routine to proceed to step S4.

In step S4, the display control section 42 displays the purchase screen display as shown in FIG. 4 on the display screen 43a on the basis of the GUI information from the communicating section 41.

Further, in a case it is determined that a screen change operation is performed by the user on the basis of the operation signal from the operating section 45, the control section 44 allows the routine to proceed to step S5, and controls the display control section 42 to change the display of the display screen 43a.

That is, in step S5, the display control section 42 changes the display of the display screen 43a to the feedback screen display from the purchase screen display, as shown in FIG. 5, under the control of the control section 44.

In step S6, the control section 44 determines whether labeling is performed by the user, on the basis of the operation signal from the operating section 45, and repeats the process of step S6 until it is determined that the labeling is performed.

That is, in step S6, the control section 44 determines whether the user performs the feedback operation with reference to the feedback screen display on the display screen 43a, and determines whether the user performs the pressing operation of pressing the search button 121, on the basis of the operation signal from the operating section 45.

In step S6, in a case where it is determined that the labeling is performed by the user, the control section 44 allows the routine to proceed to step S7, and then generates part preference information on the basis of the operation signal from the operating section 45 and supplies the part preference information to the communicating section 41.

In step S8, the communicating section 41 transmits the part preference information from the control section 44 to the shop server $23_m$ through a network 22. In this regard, the shop server $23_m$ generates a classifier through statistic learning based on the part preference information transmitted through the network 22, and performs the search using the generated classifier. Further, the shop server $23_m$ generates GUI information for indicating the search result obtained by the search, and supplies the GUI information to the communicating section 41 through the network 22.

In step S9, the communicating section 41 supplies the GUI information supplied from the shop server $23_m$ through the network 22 to the display control section 42. The display control section 42 updates the feedback screen display on the display screen 43a to a new purchase screen display on the basis of the GUI information from the communication section 41, and then allows the routine to return to step S5 to repeat the same processes. The display control process is ended when an ending operation indicating ending of the display control process is performed by the user, for example.

As described above, according to the display control process, by displaying the feedback screen as shown in FIG. 5 on the display screen 43a, the labeling is performed on each part of the product by the feedback operation of the user.

Accordingly, the user terminal $21_n$ can feed back more detailed user preferences to the shop server $23_m$ as the part preference information by the feedback operation of the user, compared with the case where the labeling is performed to the product itself.

Thus, even in a case where the amount of the part preference information from the user terminal $21_n$ is relatively small, the shop server $23_m$ can generate the classifier with high search accuracy.

That is, for example, in the case where the labeling is performed to the product itself, it is difficult to know which part of the respective parts of the product is labeled. Thus, in this case, in the statistic learning of generating a classifier, a large amount of labeled image data is required as teacher data.

On the other hand, in a case where the labeling is performed to each part of the product, it is clear which part is labeled. Accordingly, in this case, by the statistic learning using a small amount of labeled part images, it is possible to generate a classifier with high search accuracy.

Further, even in a case where the amount of the part preference information from the user terminal $21_n$ is relatively small, since the shop server $23_m$ can generate the classifier with high search accuracy, it is possible to reduce the feedback operation of the user, to thereby reduce the burden on the user.

Further, according to the display control process, since the purchase screen display as shown in FIG. 4 is displayed on the display screen 43a, compared with the case of a product image display in which all the products are displayed, the user can compare different products in a detailed part unit.

[Configuration Example of Shop Server $23_m$]

Figure 7:
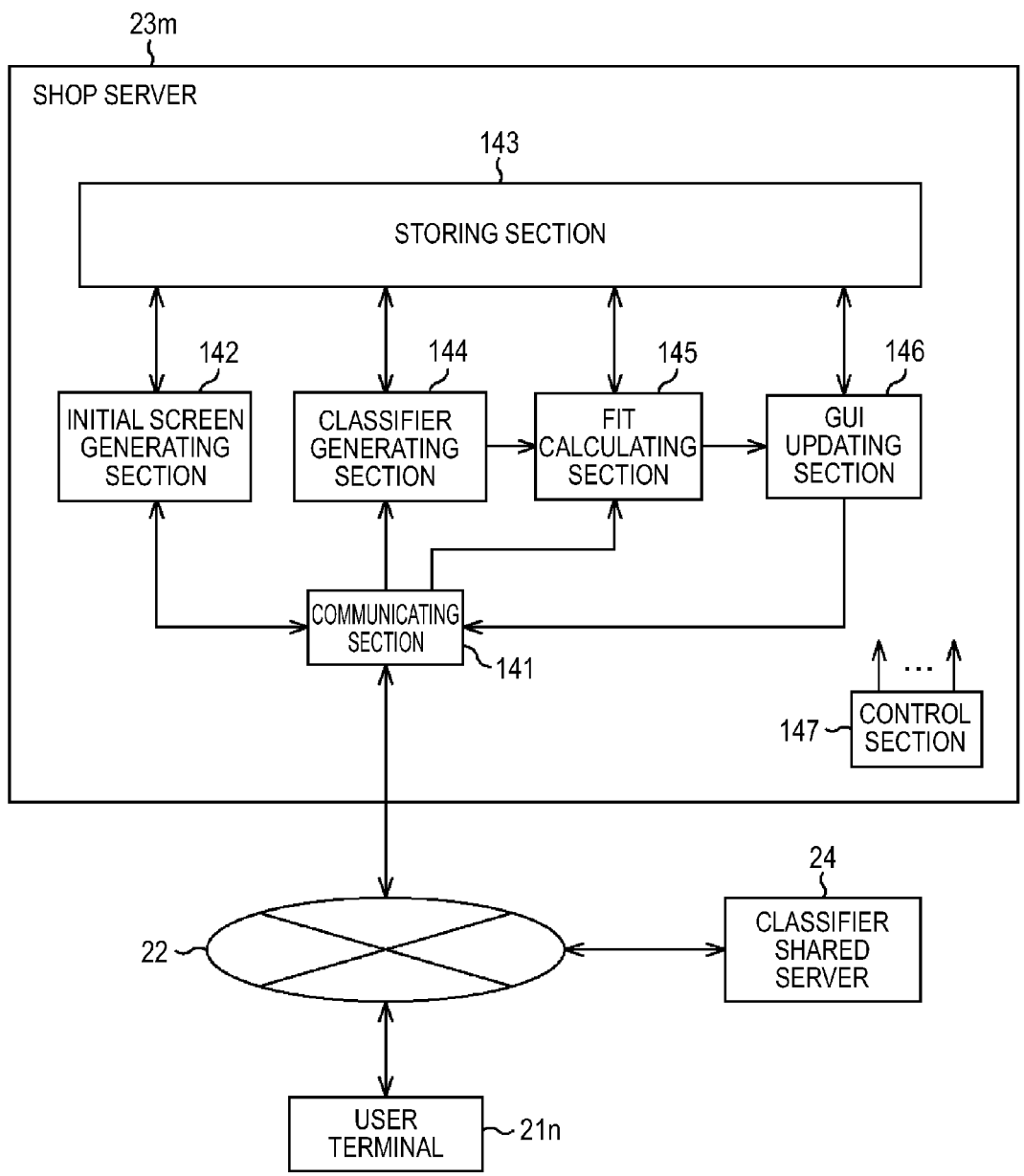
FIG. 7 is a block diagram illustrating an example of a configuration of a shop server.

Next, FIG. 7 illustrates a configuration example of the shop server $23_m$.

The shop server $23_m$ includes a communicating section 141, an initial screen generating section 142, a storing section 143, a classifier generating section 144, a fit calculating section 145, a GUI updating section 146 and a control section 147.

The communicating section 141 reads a classifier shared with a shop server $23_{m'}$ from the classifier shared server 24 through the network 22, on the basis of the user ID supplied from the user terminal $21_n$ through the network 22, and supplies the classifier to the fit calculating section 145.

Further, in a case where the classifier shared with the shop server $23_{m'}$ is not present in the classifier shared server 24, the communicating section 141 generates a request signal which requires for a search key, and then transmits the request signal to the user terminal $21_n$ through the network 22.

Further, according to the transmission of the request signal, the communicating section 141 supplies the search key supplied from the user terminal $21_n$ through the network 22 to the initial screen generating section 142.

Further, the communicating section 141 supplies the part preference information supplied from the user terminal $21_n$ through the network 22, to the classifier generating section 144. Further, the communicating section 141 supplies the GUI information from the initial screen generating section 142 or the GUI updating section 146 to the user terminal $21_n$ through the network 22.

The initial screen generating section 142 generates a GUI for displaying an initial screen with respect to the accessed user terminal $21_n$. That is, for example, the initial screen generating section 142 performs search on the basis of the search key from the communicating section 141, displays GUI information for displaying the search result obtained by the search, and then supplies the GUI information to the communicating section 141.

The storing section 143 is a hard disk or the like, for example, and stores in advance the plurality of part images for each of the plurality of products each of which is sold in the shop server $23_m$. Specifically, for example, the storing section 143 stores in advance the plurality of part images (for example, part images $81_1$ to $81_3$, part images $82_1$ to $82_3$, part images $83_1$ to $83_3$, and so on) in the clothes as a product.

Further, it is assumed that the storing section 143 stores a product image of each product which is sold in the shop server $23_m$. The product image is used, for example, when the search is performed on the basis of the search key, in the initial screen generating section 142.

The classifier generating section 144 may generate a classifier (function) using an SVM (Support Vector Machine), for example, on the basis of the part preference information from the communicating section 141, and supplies the classifier to the fit calculating section 145. Details of the SVM will be described later with reference to FIG. 8.

Here, the classifier generating section 144 may generate the classifier using a Bayes classifier, boosting algorithm or the like, instead of the SVM.

The fit calculating section 145 calculates a part fit indicating the level that the part displayed in the part image is fit for the user preference for each of the plurality of part images, on the basis of the classifier from the classifier generating section 144 or the classifier from the communicating section 141.

Further, the fit calculating section 145 calculates a target fit indicating the level that the product which is a retrieval target is fit for the user preference on the basis of the part fit calculated for each of the plurality of part images, and then supplies the result to the GUI updating section 146.

Details of the process performed by the fit calculating section 145 will be described later with reference to FIGS. 9 to 11.

The GUI updating section 146 generates GUI information for updating the GUI of the display screen 43a in the accessing user terminal $21_n$.

That is, for example, the GUI updating section 146 searches a product desired by the user from the plurality of products on the basis of the target fit from the fit calculating section 145, generates GUI information for displaying the search result obtained by the search, and then supplies the result to the communicating section 141.

The control section 147 controls the communicating section 141, the initial screen generating section 142, the classifier generating section 144, the fit calculating section 145 and the GUI updating section 146.

Next, FIG. 8 illustrates an example of a case where the classifier generating section 144 generates a classifier by the statistic learning using the SVM.

In FIG. 8, for example, the classifier generating section 144 reads four part images (hereinafter, referred to as "positive images") to which a fit label is added and three part images (hereinafter, referred to as "negative images") to which an unfit label is added, from the storing section 143, on the basis of the part preference information from the communicating section 141.

FIG. 8 illustrates a coordinate plane defined by two axes of an X axis representing an image feature amount x, and Y axis representing an image feature amount y. On the coordinate plane, four image feature amounts $(x_1, y_1)$ to $(x_4, y_4)$ which are respectively extracted from four positive images are disposed as four coordinates indicated by a circle sign.

Further, on the coordinate plane, three image feature amounts $(x_5, y_5)$ to $(x_7, y_7)$ which are respectively extracted from three negative images are disposed as three coordinates indicated by an X sign.

The classifier generating section 144 extracts the four image feature amounts $(x_1, y_1)$ to $(x_4, y_4)$ from the four positive images, respectively, and extracts the three image features $(x_5, y_5)$ to $(x_7, y_7)$ from the three negative images, respectively.

Further, the classifier generating section 144 determines a separating hyperplane on the basis of seven image feature amounts $(x_1, y_1)$ to $(x_7, y_7)$. The separating hyperplane is determined so that a margin which is a distance between the separating hyperplane and the image feature amount (in the case of FIG. 8, $(x_1, y_1)$ and $(x_5, y_5)$) called a support vector, which is disposed in the vicinity of the separating hyperplane is maximized.

Further, the classifier generating section 144 generates a classifier which calculates the part fit for each of the plurality of part images, on the basis of the determined separating hyperplane, and then supplies the result to the fit calculating section 145.

Here, for ease of description, the classifier generating section 144 generates one classifier as described with reference to FIG. 8.

However, the classifier generating section 144 may generate a plurality of weak classifiers or may generate one classifier including the generated plurality of weak classifiers. Further, the classifier generating section 144 may generates a plurality of classifiers which calculates the part fit for each part image of a different part.

Next, an example in a case where the fit calculating section 145 calculates a plurality of part fits $P_{in}$ for each part of a target (search target) n, and calculates a target fit $r_n$ of the target n on the basis of the calculated plurality of part fits, will be described with reference to FIGS. 9 to 11.

The fit calculating section 145 calculates the part fit $P_{in}$ indicating the fit level of the user preference and the part for each of the plurality of part images, on the basis of the classifier from the classifier generating section 144.

That is, for example, the fit calculating section 145 calculates a distance between a coordinate point 161 of the image feature amount $(x_1, y_1)$ and the separating hyperplane as the part fit of the part image corresponding to the image feature amount $(x_1, y_1)$. Further, for example, the fit calculating section 145 calculates a multiplication result obtained by multiplying a distance between a coordinate point 162 of the image feature amount $(x_5, y_5)$ and the separating hyperplane by −1 as the part fit of the part image corresponding to the image feature amount $(x_5, y_5)$.

Further, the fit calculating section 145 calculates the target fit $r_n$ for each target n using the next expression (1) on the basis of the part fit $P_{in}$.

$$r_n = \Sigma w_i P_{in} \quad (1)$$

In expression (1), i=0, 1, 2, ..., I, and n=0, 1, 2, 3, 4, ..., N (different from the suffix n of the user terminal $21_n$). Further, $\Sigma$ represents a product-sum operation of $w_i$ and $P_{in}$, and a weight $w_i$ is $\exp(-ai)=1/e^{ai}$. Further, a>0, and e represents a base of natural logarithm (exponential).

Specifically, for example, as shown in FIG. 9, the fit calculating section 145 calculates a target fit $r_1$ ($=w_0P_{01}+w_1P_{11}+w_2P_{21}$) of a target 1, on the basis of a part fit $P_{01}$ of a part image $82_1$, a part fit $P_{11}$ of a part image $82_2$, and a part fit $P_{21}$ of a part image $82_3$. In FIG. 9, i=0, 1, 2, ..., and n=0, 1, 2, 3, 4, ..., N.

The fit calculating section 145 supplies the target fits $r_0$, $r_1$, ..., $r_N$ calculated for each of the targets 0, 1, ..., N to the GUI updating section 146.

The GUI updating section 146 generates the GUI information for displaying the part image so that the corresponding fit order on the fit axis 61 is high as the target fits is high, on the basis of the target fits $r_0, r_1, \ldots, r_N$ from the fit calculating section 145, and then supplies the result to the communicating section 141.

Next, a processing example in a case where a part of the part images is not present will be described with reference to FIG. 10.

For example, as shown in FIG. 10, in a case where a part image $84_2$ is not present, the fit calculating section 145 cannot calculate the part fit $P_{13}$ of the part image $84_2$ using the classifier from the communicating section 141 or the classifier generating section 144. The reason is that the classifier calculates the part fit $P_{13}$ on the basis of the part image $84_2$.

In this case, for example, the fit calculating section 145 calculates an average value of the part fits $P_{10}$, $P_{11}$, $P_{12}$, $P_{14}$ ... of the respective part images $81_2$, $82_2$, $83_2$, $85_2$, ... in which the parts of the same rear surface portion are displayed, as the part fit $P_{13}$ of the part image $84_2$.

Accordingly, for example, even in a case where the part image $84_2$ is not present, since it is possible to calculate the part fit $P_{13}$ of the part image $84_2$, it is possible to calculate the target fit $r_3$ of the target 3.

Further, for example, the fit calculating section 145 may conveniently treat the part fit $P_{13}$ of the part image $84_2$ which is not present, as an integer C (for example, 0), to thereby calculate the target fit $r_3$ of the target 3.

As described above, the fit calculating section 145 uses the weight $w_i$ ($=\exp(-ai)$) which is changed according to the part importance i when the target fit $r_n$ is calculated, which is not limitative.

That is, for example, in the user terminal $21_n$, the part to which any one of the fit label and the unfit label is added may be given a low importance i by the user, and may set the weight $w_i$ of the corresponding part to 0.

Here, in FIG. 11, the fit label (indicated by a black frame) is added to the part image $81_1$ and the part image $82_1$, and the unfit label (indicated by a white frame) is added to the part image $85_1$. Accordingly, in the part images which display the parts of the front surface portion, the fit label or the unfit label is added three times.

Further, for example, the fit label is added to the part image $82_3$ and the part image $83_3$. Accordingly, in the part images which display the parts of the chest portion, the fit label or the unfit label is added two times.

However, in FIG. 11, the fit label or the unfit label is not added to any one of the part images $81_2$, $82_2$, $83_2$, $84_2$, $85_2$, ... which are surrounded by a solid line. Accordingly, in the part images which display the parts of the rear surface portion, the fit label or the unfit label is not added.

In the case as shown in FIG. 11, the fit calculating section 145 may calculate the target fit $r_n$ using the weight $w_1$ corresponding to the parts of the rear surface portion as 0.

Further, for example, the fit calculating section 145 may calculate the target fit $r_n$ by changing the corresponding weight $w_i$ to weight $w_i'(=k \times w_i)$, for example, according to the addition times k of the fit label or the unfit label.

Specifically, for example, in the case as shown in FIG. 11, the fit calculating section 145 calculates the target fit $r_n$ by changing weight $w_0$ to weight $w_0'(=3 \times w_0)$, by changing weight $w_1$ to weight $w_1'(=0 \times w_1)$, and by changing weight $w_2$ to weight $w_2'(=2 \times w_2)$, respectively.

[Operation of Shop Server $23_m$]

Next, a first fit calculation process performed by, for example, the shop server $23_{m1}$ will be described with reference to a flowchart of FIG. 12.

The shop server $23_{m1}$ is a shop server that specializes in selling "cute-style dresses", and shares the classifier m1 with the shop server $23_{m1}$ that similarly specializes in selling "cute-style dresses". The classifier m1 is generated in the shop server $23_{m1}$ or the shop server $23_{m1'}$, and is stored in the classifier shared server 24.

The first fit calculation process is started when the communication with the user terminal $21_n$ is started, for example.

In step S21, for example, the communicating section 141 receives the user ID "user1" transmitted from the user terminal $21_n$ operated by the first user through the network 22.

In step S22, the communicating section 141 determines whether the classifier m1 corresponding to the received user ID "user1" is stored in the classifier shared server 24, with reference to the table 24a of the classifier shared server 24 which is connected through the network 22.

If it is determined in step S22 that the classifier m1 is not stored in the classifier shared server 24, the communicating section 141 allows the routine to proceed to step S23. Further, the communicating section 141 transmits a request signal which requests a search key to the user terminal $21_n$ through the network 22, under the control of the control section 147.

In step S24, the communicating section 141 receives the search key transmitted from the user terminal $21_n$ through the network 22 and supplies the search key to the initial screen generating section 142, as the request signal is transmitted.

In step S25, the initial screen generating section 142 calculates the target fit of each product, on the basis of the search key from the communicating section 141.

That is, for example, in a case where the search key is an inquiry image, the initial screen generating section 142 extracts an image feature amount from the inquiry image, and calculates the similarity between the extracted image feature amount and an image feature amount of a product image which displays the product as the target fit.

Further, for example, in a case where the search key is a keyword, the initial screen generating section 142 calculates the target fit so that the target fit becomes high for the product displayed in the product image having the keyword as meta information.

Further, the initial screen generating section 142 performs the search of the product desired by the user on the basis of the target fit calculated for each product, generates GUI information for displaying the search result obtained by the search, and then supplies the result to the communicating section 141.

In step S26, the communicating section 141 transmits the GUI information from the initial screen generating section 142 to the user terminal $21_n$ through the network 22, and then allows the routine to proceed to step S32. Thereafter, the search with higher search accuracy is performed according to the feedback operation of the user. Processes of step S32 and thereafter will be described later.

Further, if it is determined in step S22 that the classifier m1 is stored in the classifier shared server 24, the communicating section 141 reads the classifier m1 from the classifier shared server 24 through the network 22, supplies the result to the fit calculating section 145, and then allows the routine to proceed to step S27.

In step S27, the fit calculating section 145 calculates the part fit for each of the plurality of part images which are stored in the storing section 143, on the basis of the classifier m1 from the communicating section 141, and allows the routine to proceed to step S28.

In step S28, the fit calculating section 145 calculates the target fit of each product which is the search target, on the basis of the part fit for each of the plurality of part images, calculated in the process of step S27, and then supplies the result to the GUI updating section 146.

In step S29, the GUI updating section 146 performs search on the basis of the target fit of each product from the fit calculating section 145. Further, in step S30, the GUI updating section 146 generates the GUI information for displaying the search result obtained by the search in step S29, and then supplies the result to the communicating section 141.

In step S31, the communicating section 141 transmits the GUI information from the GUI updating section 146 to the user terminal $21_n$ through the network 22, and then allows the routine to proceed to step S32.

In step S32, the communicating section 141 waits until the part preference information is received from the user terminal $21_n$ through the network 22. That is, as labeling is performed by the user in the user terminal $21_n$ and the search button 121 in FIG. 5 is pressed, the communicating section 141 waits until the part preference information is transmitted from the user terminal $21_n$.

Further, in a case where the part preference information is received from the user terminal $21_n$ through the network 22, the communicating section 141 supplies the received part preference information to the classifier generating section 144, and then allows the routine to proceed to step S33.

In step S33, the classifier generating section 144 discerns the labeled part image on the basis of the part preference information from the communicating section 141, generates (learns) a new classifier m1 on the basis of the labeled part image, and then supplies the result to the fit calculating section 145. The new classifier m1 is supplied to the classifier shared server 24 from the classifier generating section 144 through the communicating section 141 and the network 22, and is stored by overwriting.

In step S34, the fit calculating section 145 calculates the part fit for each of the plurality of part images stored in the storing section 143 on the basis of the new classifier m1 from the classifier generating section 144, and then allows the routine to return to step S28.

Further, in step S28, the fit calculating section 145 calculates the target fit of each product on the basis of the part fit for each of the plurality of part images, calculated in the process of step S34, supplies the result to the GUI updating section 146. Then, the routine proceeds to step S29, to repeat the same processes thereafter. For example, the first fit calculation process is ended when the communication with the user terminal $21_n$ is ended.

As described above, according to the first fit calculation process, since the classifier is generated on the basis of the part preference information indicating each labeled part from the user terminal $21_n$, it is possible to generate the classifier with a small amount of part preference information, compared with a case where entire preference information indicating the labeled product itself is used.

Further, in step S27, the shop server $23_{m1}$ uses the classifier m1 which is generated, for example, by the shop server $23_{m1}$, and is stored in the classifier shared server 24. Accordingly, the shop server $23_{m1}$ should not generate the classifier from the beginning, and it is possible to obtain a search result desired by the user, with less feedback operation of the user.

However, in the first fit calculation process, if it is determined in step S22 that the classifier m1 is not stored in the classifier shared server 24, the target fit is calculated on the basis of the search key in steps S23 to S25.

However, if the classifier m1 is not stored, as described with reference to FIG. 13, the classifier m2 of the search target which belongs to a category which is similar to a category of each product which is the search target may be used instead of the search key, to thereby calculate the target fit.

[Other Operations of Shop Server $23_m$]

Next, a second fit calculation process performed, for example, by the shop server $23_{m1}$ will be described with reference to a flowchart of FIG. 13.

The second fit calculation process is different from the first fit calculation process in that processes of steps S53 and S58 are newly added, but is the same as the first fit calculation process in the other processes.

In steps S51 and S52, the same processes as in steps S21 and S22 in FIG. 12 are performed, respectively. In a case where it is determined in step S52 by the communicating section 141 that the classifier m1 is not stored in the classifier shared server 24, the routine proceeds to step S53.

In step S53, the communicating section 141 determines whether the classifier m2 is stored in the classifier shared server 24 with reference to the table 24a of the classifier shared server 24 which is connected through the network 22.

That is, the communicating section 141 determines whether the classifier m2 generated by the feedback operation which is performed for each product of a category which is similar to a category "cute-style dresses" of each product which is the search target, that is, a similar category "adult-style dresses" which is common in that they are dresses is stored in the classifier shared server 24.

If it is determined in step S53 that the classifier m2 is not stored in the classifier shared server 24, the communicating section 141 allows the routine to proceed to step S54. In steps S54 to S57, the same processes as in steps S23 to S26 in FIG. 12 are performed.

Insteps S59 to S66, the same processes as insteps S27 to S34 of FIG. 12 are performed.

Further, if it is determined in step S53 that the classifier m2 is stored in the classifier shared server 24, the communicating section 141 reads the classifier m2 from the classifier shared server 24 through the network 22, supplies the classifier m2 to the fit calculating section 145, and then allows the routine to proceed to step S58.

In step S58, the fit calculating section 145 calculates the part fit for each of the plurality of part images stored in the storing section 143 on the basis of the classifier m2 from the communicating section 141, and then allows the routine to proceed to step S60.

In step S60, the fit calculating section 145 calculates the target fit of each product on the basis of the part fit for each of the plurality of part images, calculated in the process of step S58, and supplies the calculated target fit to the GUI updating section 146. Thereafter, the routine proceeds to step S61, and then the same processes are repeated. The second fit calculation process is ended when the communication with the user terminal $21_n$ is ended, for example.

As described above, according to the second fit calculation process, even in a case where the classifier m1 is not present in the classifier shared server 24, since it is possible to perform the search using the classifier m2 without using the search key, it is possible to generate GUI information for displaying a product desired by the user, compared with a case where the search is performed using the search key.

In the second fit calculation process, in a case where the classifier m1 is not stored, the classifier m2 which is completely stored is used instead of the classifier m1, but a plurality of classifiers may be used, for example.

That is, for example, the shop server $23m_1$ may use the classifier m3 of the target "cute camisoles" which is common in that they are classified as cute, in addition to the classifier m2 of the target "adult-style dresses" which is common in that they are dresses.

In this case, for example, the search is performed on the basis of an average value $(\alpha+\beta)/2$ of a target fit $\alpha$ which is calculated on the basis of the classifier m2 and a target fit $\beta$ which is calculated on the basis of the classifier m3.

Accordingly, for example, even in a case where the target fit $\alpha$ does not appropriately represent the user preference, when the target fit $\beta$ is relatively fit for the user preference, it is possible to obtain the search result which is further fit for the user preference, compared with the search result using the target fit $\alpha$.

As described above, in the first fit calculation process, the shop server $23_{m1}$ shares the classifier m1 which is completely stored in the classifier shared server 24, with the shop server $23_{m1'}$. Further, in the second fit calculation process, in a case where the classifier m1 is not stored in the classifier shared server 24, the shop server $23_{m1}$ uses the classifier m2 with respect to a product group which is similar to a product group which is the search target, instead of the classifier m1.

Here, the shop server $23_{m1}$ uses only the classifiers m1, m2 and m3 which are stored corresponding to the user ID "user1" of the first user, in the first user of the accessing user terminal $21_n$, but the classifiers to be used are not limited thereto.

Further, for example, in a case where the first user purchases a predetermined product and presents the product to the second user, the classifier m1' may be used instead of the classifier m1 in the first fit calculation process, but the classifiers m1' and m2' may be used instead of the classifiers m1 and m2 in the second fit calculation process.

In this case, the shop server $23_{m1}$ may generate GUI information according to the preference of the second user, and may display the search result fit for the preference of the second user on the display screen 43a of the user terminal $21_n$ corresponding to the first user.

Thus, the first user may purchase the product fit for the preference of the second user while referencing the purchase screen display which is displayed on the display screen 43a. In a case where an input operation of inputting the search key or the feedback operation is performed by the first user in the user terminal $21_n$, the input operation or the feedback operation is performed in consideration of the preference of the second user instead of the preference of the first user.

Further, for example, in a case where the first user corresponding to the user ID "user1" and the second user corresponding to the user ID "user2" jointly purchase the same product from the shop server $23_{m1}$, the classifier m1' in addition to the classifier m1 may be used.

In this case, the shop server $23_{m1}$ may generate GUI information according to the preference of the first user and the preference of the second user, to thereby display the search result fit for both of the preference of the first user and the preference of the second user, on the display screen $43a$ of the user terminal $21_n$.

Thus, the first user may purchase the product fit for the preferences of the first and second users, while referencing the purchase screen display displayed on the display screen $43a$. In the user terminal $21_n$, in a case where the input operation of inputting the search key or the feedback operation is performed by the first user, the input operation or the feedback operation is performed in consideration of the preference of the second user in addition to the preference of the first user.

[Change of Part Axis 62]

In the present embodiment, for example, as shown in FIG. 4, in the part axis 62, the front surface $62a$, the rear surface $62b$ and the chest $62c$ are sequentially disposed from the top in the figure, but the display order of the names of the parts is not limited thereto.

That is, for example, by operating the operating section 45 of the user terminal $21_n$, it is possible to change the display order of the names of the parts. According to this change, the arrangement of the part images is changed. In another embodiment, the display order of the names of the parts is in a priority order determined based on part preference information from feedback from a user.

Further, for example, the user terminal $21_n$ may display the names of the respective parts in the descending order of labeled times in the respective parts. This is because the labeling is frequently performed for a part which is generally emphasized in product purchase in the feedback operation of the user.

Specifically, for example, as shown in FIG. 11, in a case where three labels are added to the part images of the front surface portion, no label is added to the part images of the rear surface portion, and two labels are added to the part images of the chest portion, the importance becomes high in the order of the front surface portion, the chest portion and the rear surface portion. Further, in the descending order of the importance, the respective part images are rearranged.

Further, for example, the part images of the front surface portion, the rear surface portion and the chest portion are displayed on the display screen $43a$ in FIG. 4, but the parts displayed in the part images are not limited to the front surface portion, the rear surface portion and the chest portion. For example, the part images to be displayed may be changed according to the user change operation.

Next, FIG. 14 illustrates an example in a case where the name on the part axis 62 is added or deleted according to the user operation.

In FIG. 14, in order to clarify the target to be added or deleted by the user operation, a prime mark (') is added to the sign. That is, in FIG. 14, for example, a case where a chest $62c'$ on the part axis 62 is added or deleted will be described.

On the display screen $43a$ in FIG. 14, the front surface $62a$, the rear surface $62b$ and the chest $62c'$ are displayed on the part axis 62, and accordingly, the part images $81_1$, $82_1$, $83_1$, $81_2$, $82_2$, $83_2$, $81_3'$, $82_3'$, $83_3'$, and so on are displayed.

In a case where the chest $62c'$ on the part axis 62 is deleted, for example, from this state, the user performs an operation of dragging the chest $62c'$ and dropping the dragged chest $62c'$ over a dust bin 181 using the operating section 45. Thus, the chest $62c'$ in the part image 62 is deleted, and the part images $81_3'$, $82_3'$, $83_3'$, and so on which display the chest portion are also deleted.

Further, for example, in a case where the chest $62c'$ and the part images $81_3'$, $82_3'$, $83_3'$, and so on are added (restored), the user selects a part (part surrounded by a thick line in the part image $81_1$) of the chest portion from the part image $81_1$, using the operating section 45. Thus, the chest $62c'$ and the part images $81_3'$, $82_3'$, $83_3'$, and so on are added.

The user selects the part of the chest portion from the part image $81_1$, but may select a part which the user desires to add from a part image (for example, the part image $81_2$, the part image $82_1$, or the like) different from the part image $81_1$.

Further, on the display screen $43a$ in FIG. 14, for example, the part image $81_1$ is displayed as a selection image used for selecting a part to be added on the part axis 62, but a new selection image differently from the part image $81_1$ may be displayed.

As the selection image, one selection image may be employed, or a plurality of selection images which respectively displays the respective parts may be employed to thereby allow the user to select a selection image which displays the part to be added from the plurality of selection images.

Further, for example, as the selection image, a three-dimensional image (stereoscopic image) may be employed to select the part to be added from the three-dimensional image. In the three dimensional image, since the product is rotatably disposed in all directions in the three dimensional image according to the user operation, it is possible to add any part of the product which is the search target only using one three-dimensional image without using a plurality of selection images (two-dimensional images) which displays the respective parts.

2. Modification

In the present embodiment, for example, the purchase screen display as shown in FIG. 4 and the feedback screen display as shown in FIG. 5 are displayed as the different display screens $43a$, respectively, but the purchase screen display and the feedback screen display may be displayed as the same display screen $43a$.

That is, for example, the display screen $43a$ in FIG. 4 may be used as the display screen $43a$ to which the fit box, the unfit box, the search button 121 shown in FIG. 5 are newly added.

Further, in the present embodiment, as the purchase screen display, the plurality of part images are displayed on the display screen $43a$, but the plurality of product images which respectively display the respective products may be displayed according to the target fit, instead of the plurality of part images.

That is, in a case where at least the feedback operation is performed, the plurality of part images may be displayed on the display screen $43a$, and in a case where the feedback operation is not performed, the plurality of part images may not be displayed.

Further, in the present embodiment, the user terminal $21_n$ generates the part preference information on the basis of the explicit feedback operation of checking the fit box or the unfit box shown in FIG. 5, but may generate the part preference information on the basis of an implicit feedback operation.

That is, for example, in a case where the user performs an operation of enlarging the part image $81_1$ to be displayed, it is considered that the implicit feedback operation that a fit label is added to the part in the part image $81_1$ is performed, and thus, it is possible to generate the part preference information.

Further, in the present embodiment, the shop server $23_m$ performs the search and the user terminal $21_n$ displays the search result obtained by the search on the display screen 43a, but each configuration of the shop server $23_m$ and the user terminal $21_n$ is not limited thereto.

That is, for example, the user terminal $21_n$ itself may perform the search and may display the search result obtained by the search on the display screen 43a. Further, the shop server $23_m$ may supply the part image to be displayed on the display screen 43a according to the demand from the user terminal $21_n$.

Specifically, for example, the display control section 42 of the user terminal $21_n$ serves as functional blocks (for example, the initial screen generating section 142, . . . , the GUI updating section 146, and the like) for calculating the target fit. In this case, the display control section 42 calculates the target fit, and performs the search on the basis of the calculated target fit. Further, the display control section 42 generates GUI information for displaying the search result obtained by the search, and controls the display section 43 on the basis of the generated GUI information.

In the present embodiment, the clothes are employed as the search target, but the search target is not limited thereto. That is, as the search target, anything can be employed as long as it includes a plurality of elements.

Specifically, for example, it is possible to employ shoes as the search target. In this case, as respective parts of the search target, for example, a front surface portion, a side surface portion, a bottom portion and the like of the shoes are employed.

Further, for example, a building may be employed as the search target. In this case, for example, an appearance, an entrance, a lounge and the like of the building may be employed as respective parts of the building.

Further, for example, as the search target, a set including a plurality of related products may be employed. In this case, the plurality of related products become the respective parts of the search target.

That is, for example, as the search target, a dining set including a fork, a spoon and a plate may be employed. In this case, for example, as part images which display the respective parts of the dining set, a first part image which displays the fork, a second part image which displays the spoon and a third part image which displays the plate may be employed.

Further, for example, a plurality of sub part images which respectively display the respective parts of the fork may be employed, instead of the first part image. This may be similarly applied to the second part image and the third part image.

Further, for example, as the search target, instead of the dining set, a television set including a remote controller and a television receiver, a living room set including a sofa, a chair and a table, a suit set including a suit, a dress shirt, a necktie, and shoes, or the like may be used.

Further, for example, as the search target, a still image may be employed. In this case, for example, the respective areas on the still image may be employed as respective parts of the still image.

Further, for example, as the search target, a moving image including a plurality of images may be employed. In this case, for example, a beginning scene, a mid scene, a final scene and the like in the moving image may be employed as respective parts of the moving image. Further, as the part images, images (for example, images optimally indicating content of the scene, from the respective images which forms the scene) which respectively represent the beginning scene, the mid scene and the final scene may be employed.

Further, for example, as the search target, music or the like may be employed. In this case, for example, part images which respectively display a part of lyrics of the music as characters are displayed on the display screen 43a.

Further, a reproduction button or the like for reproducing the part of the lyrics displayed in the part image as sound around the part image may be installed on the display screen 43a. Furthermore, a reproduction button or the like for reproducing, as sound, each part of the corresponding lyrics as the part image may be disposed on the display screen 43a.

Further, for example, in a case where the music is formed of a plurality of sounds obtained by playing the guitar, drum and base, respectively, a reproduction button or the like for respectively reproducing the guitar sound, the drum sound and the base sound may be displayed as the part image.

In a case where the music is employed as the search target, a classifier may be generated on the basis of a sound feature amount extracted from sound (for example, guitar sound or the like) corresponding to the labeled part image.

Further, a music video (promotion video) or the like which includes music and a moving image may be employed as the search target. In this case, at least one of the part image displayed when the music is employed or the part image displayed when the moving image is employed is displayed on the display screen 43a.

However, the series of processes as described above may be performed by hardware, or may be performed by software. In a case where the series of processes is performed by software, a program which forms the software is installed, from a program recording medium, in a computer mounted in dedicated hardware, a general-purpose computer or the like which is installed with a variety of programs to be able to perform a variety of functions, for example.

[Configuration Example of Computer]

FIG. 15 is a block diagram illustrating a configuration example of hardware of a computer which executes the above-described series of processes by programs.

A CPU (Central Processing Unit) 201 executes a variety of processes according to programs stored in a ROM (Read Only Memory) 202 or a storing section 208. Programs, data, or the like to be executed by the CPU 201 are appropriately stored in a RAM (Random Access Memory) 203. The CPU 201, the ROM 202 and the RAM 203 are connected to each other by a bus 204.

An input and output interface 205 is connected to the CPU 201 through the bus 204. An input section 206 including a keyboard, a mouse, a microphone or the like, and an output section 207 including a display, a speaker or the like are connected to the input and output interface 205. The CPU 201 performs a variety of processes according to commands input from the input section 206. Further, the CPU 201 outputs the process result to the output section 207.

The storing section 208 which is connected to the input and output interface 205 includes a hard disk, for example, and stores programs to be executed by the CPU 201 or a variety of data. A communicating section 209 performs communication with external apparatuses through a network such as the Internet or a local area network.

Further, programs may be obtained through the communication section 209, and may be stored in the storing section 208.

When a removable media 211 such as a magnetic disk, an optical disc, a magneto-optical disc, a semiconductor memory or the like is installed, a drive 210 connected to the input and output interface 205 drives the removable media 211, and obtains programs, data or the like recorded thereon. The obtained programs or data are transmitted to and stored in the storing section 208 as necessary.

The recording medium which records (stores) the programs which are installed in the computer and can be executed by the computer includes the removable media 211 which is a package media including a magnetic disk (including a flexible disc), an optical disc (CD-ROM (Compact Disc-Read Only Memory), DVD (Digital Versatile Disc)), a magneto-optical disc (MD (Mini-Disc)), a semiconductor memory or the like, the ROM 202 in which the programs are temporarily or permanently stored, a hard disk which forms the storing section 208, or the like, as shown in FIG. 15. Recording of the programs to the recording medium is performed by a wired or wireless communication medium called a local area network, the Internet, digital satellite broadcasting, through the communication section 209 which is an interface such as a router, a modem or the like, as necessary.

In this description, the steps corresponding to the series of processes as described above may be performed in a time series manner, or may be performed in parallel or individually.

Further, in this description, the system refers to an entire system including a plurality of devices or apparatuses.

Further, the present disclosure is not limited to the above-described embodiments, and may have a variety of modifications without departing from the spirit of the present disclosure.

What is claimed is:

1. A search device comprising:
   a circuit configured to:
      receive, from a client terminal of a user, feedback information for a plurality of parts items of a product, and
      search information of products based on the feedback information, wherein the feedback information indicates whether or not the user prefers the parts items and is from an operation to the parts items indicated on a display ordered by fit order.

2. The search device of claim 1, wherein the circuit is to cause display of parts information of the information of products on a basis of a first axis, respective parts items to which the parts information correspond and a second axis, the second axis intersecting the first axis.

3. The search device of claim 2, wherein at least one of the parts information includes a text character.

4. The search device of claim 2, wherein at least one of the parts information includes an image.

5. The search device of claim 2,
   wherein the parts information are displayed on a basis of the respective parts items to which the parts information correspond ordered by another fit order.

6. The search device of claim 2,
   wherein names of the parts information are displayed in a priority order determined based on part preference information from the feedback information.

7. The search device of claim 1, wherein the search uses a classifier generated based on the feedback information.

8. The search device of claim 1, wherein the circuit calculates:
   first level information of whether the parts items are fit for a user preference based on the feedback information, and
   second level information of whether the parts items are fit for the user preference based on the first level information; and
   wherein a search result of the search is based on the second level information.

9. The search device of claim 1, wherein the circuit is configured to control the search of second parts items based on the feedback information for displayed parts information of the plurality of parts items, the feedback information indicating whether a part information of at least one of the parts items is fit for a user preference,
   wherein, for each of the plurality of parts items, the part information thereof is displayed at the client terminal in an order based on second feedback information.

10. The search device of claim 9, wherein at least one of the displayed parts information includes a text character.

11. The search device of claim 9, wherein at least one of the displayed parts information includes an image.

12. A method of searching comprising:
   receiving, by a circuit, from a client terminal of a user, feedback information for a plurality of parts items of a product; and
   searching, by the circuit, information of products based on the feedback information, wherein the feedback information indicates whether or not the user prefers the parts items and is from an operation to the parts items indicated on a display ordered by fit order.

13. A non-transitory recording medium recorded with a computer readable program executable by a computer, the program comprising:
   receiving, from a client terminal of a user, feedback information for a plurality of parts items of a product; and
   searching information of products based on the feedback information, wherein the feedback information indicates whether or not the user prefers the parts items and is from an operation to the parts items indicated on a display ordered by fit order.

14. A search device comprising:
   a circuit configured to:
      receive, from a client terminal of a user, feedback information for a plurality of parts items of a product, and
      search information of products based on the feedback information,
   wherein the feedback information indicates whether or not the user prefers the parts items,
   wherein the circuit is to cause display of parts information of the information of products on a basis of a first axis, respective parts items to which the parts information correspond and a second axis, the second axis intersecting the first axis.

* * * * *